(12) United States Patent
Zhou et al.

(10) Patent No.: US 9,922,002 B2
(45) Date of Patent: Mar. 20, 2018

(54) EFFICIENT REPRESENTATIONS OF GRAPHS WITH MULTIPLE EDGE TYPES

(71) Applicant: Palo Alto Research Center Incorporated, Palo Alto, CA (US)

(72) Inventors: Rong Zhou, San Jose, CA (US); Daniel Davies, Palo Alto, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 697 days.

(21) Appl. No.: 14/263,715

(22) Filed: Apr. 28, 2014

(65) Prior Publication Data

US 2015/0310644 A1  Oct. 29, 2015

(51) Int. Cl.
| | |
|---|---|
| G06F 17/16 | (2006.01) |
| G06T 11/20 | (2006.01) |
| G06F 17/10 | (2006.01) |
| G06F 17/30 | (2006.01) |

(52) U.S. Cl.
CPC ............ G06F 17/16 (2013.01); G06F 17/10 (2013.01); G06F 17/30958 (2013.01); G06T 11/206 (2013.01); G06F 17/30961 (2013.01)

(58) Field of Classification Search
CPC .... G06F 17/10; G06F 17/16; G06F 17/30958; G06F 17/30961; G06T 11/206
See application file for complete search history.

(56) References Cited

U.S. PATENT DOCUMENTS

| | | | | |
|---|---|---|---|---|
| 7,676,781 B1* | 3/2010 | Salowe | ............... | G06F 17/5045 |
| | | | | 716/126 |
| 2012/0274632 A1* | 11/2012 | Ivanov | ................... | G06T 15/00 |
| | | | | 345/419 |
| 2013/0031133 A1* | 1/2013 | Adzic | ............... | G06F 17/30321 |
| | | | | 707/778 |

* cited by examiner

*Primary Examiner* — Jwalant Amin
(74) *Attorney, Agent, or Firm* — Shun Yao; Park, Vaughan, Fleming & Dowler LLP

(57) ABSTRACT

One embodiment of the present invention provides a computing system. The computing system includes a processor and a computer-readable storage medium. The computer-readable storage medium stores instructions which when executed by the processor cause the processor to perform a method. The method comprises obtaining from a first data structure one or more pointers to corresponding elements in a second data structure. A respective vertex of a graph corresponds to an element in the first data structure and the graph supports multiple edge types between respective vertex pairs. The method further comprises obtaining from the second data structure a respective edge type associated with a respective vertex and a respective successor vertex of the edge type and enumerating a respective successor vertex of an edge type of a vertex from the second data structure based on a pointer in an element in the first data structure associated with the vertex.

25 Claims, 23 Drawing Sheets

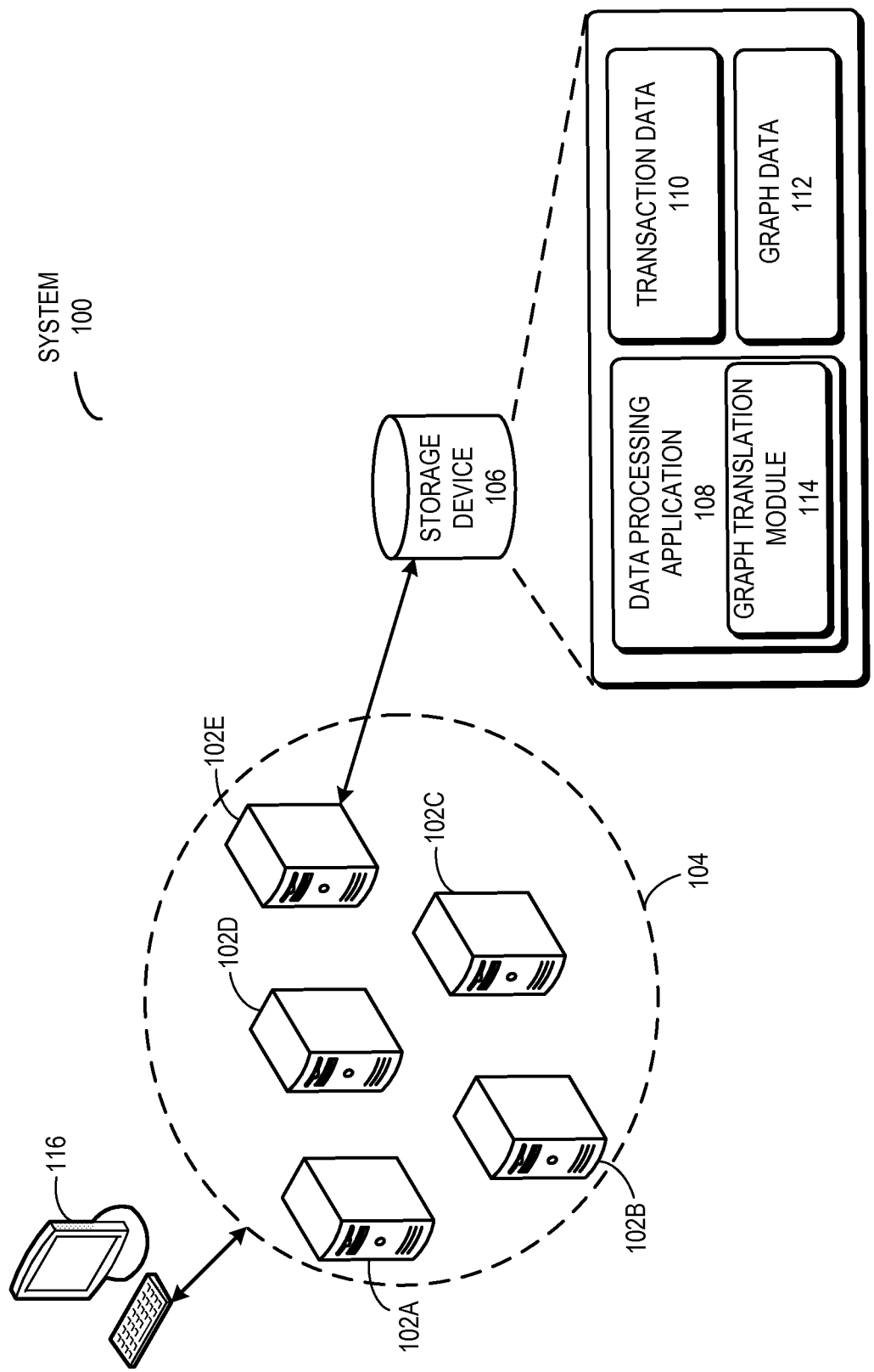

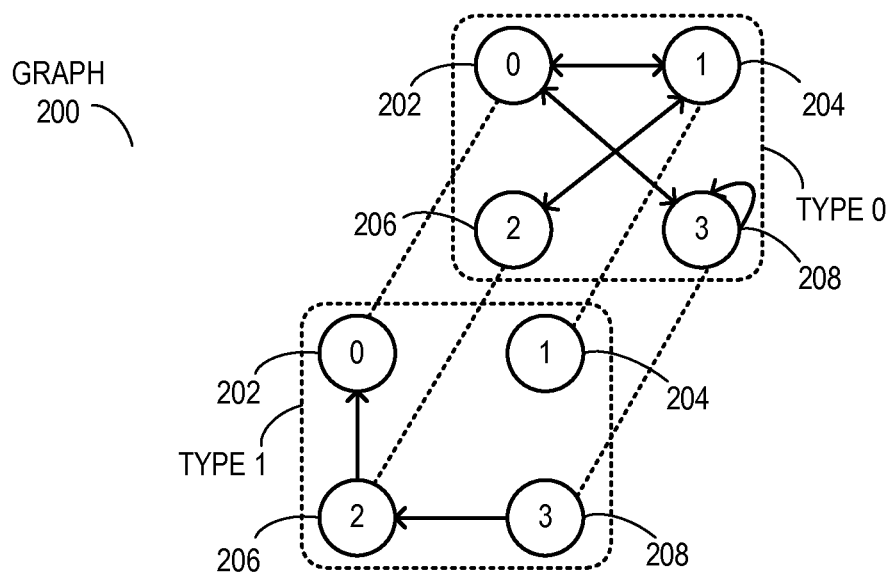
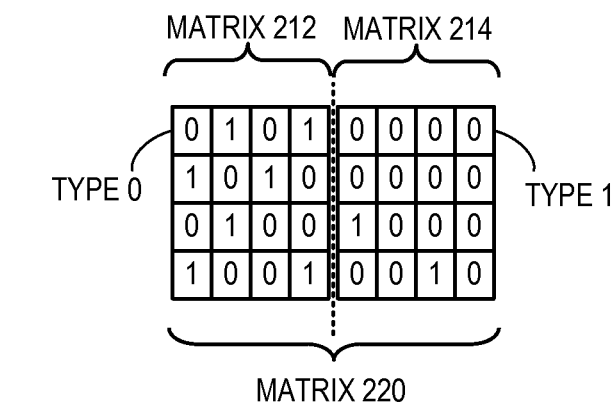
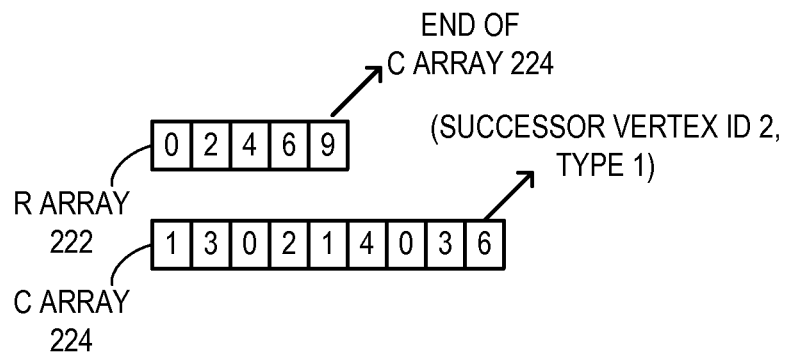
FIG. 2A

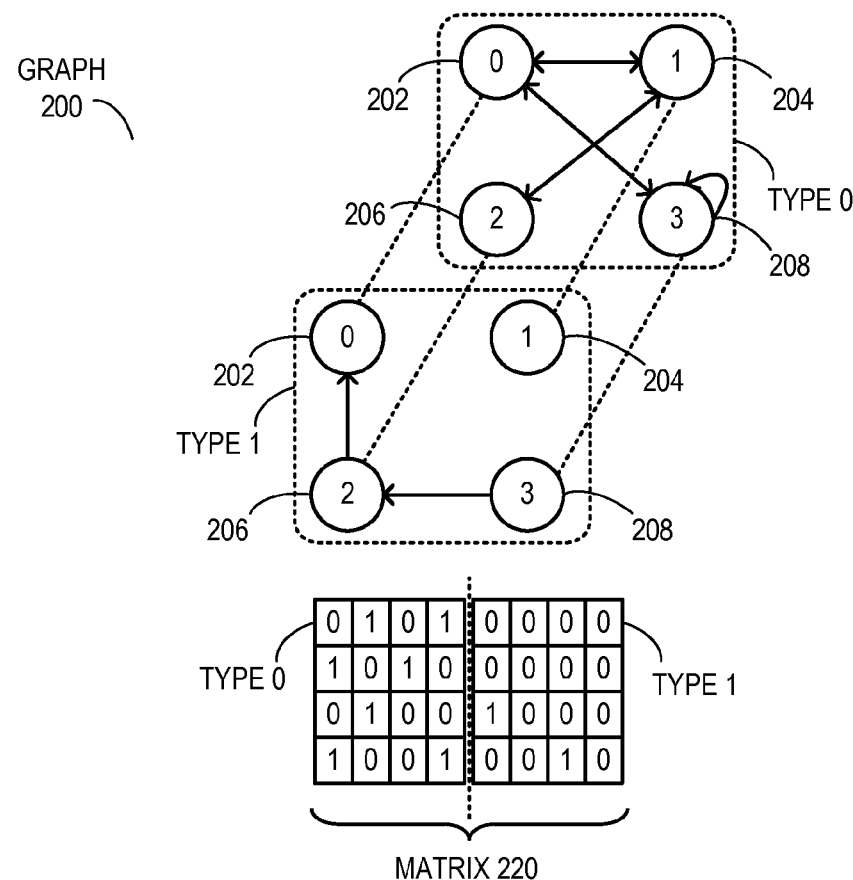
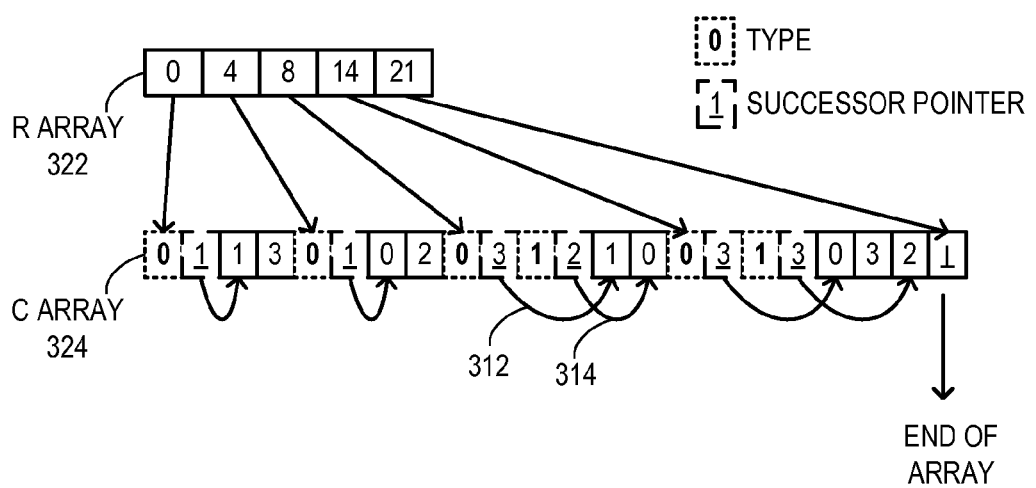
FIG. 3A

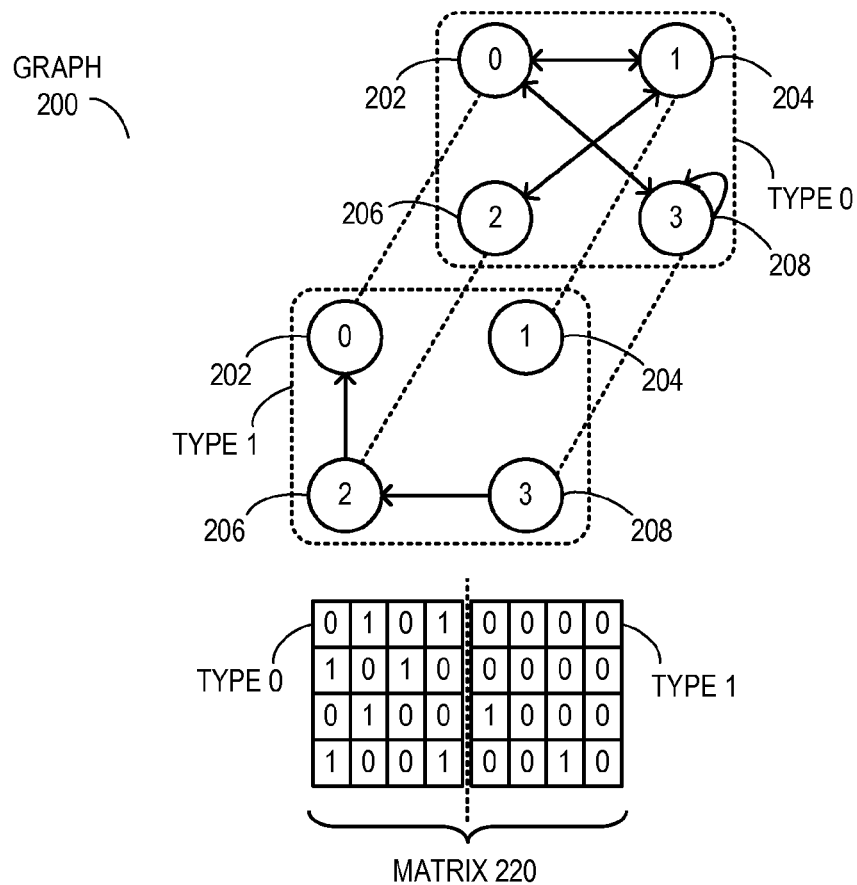
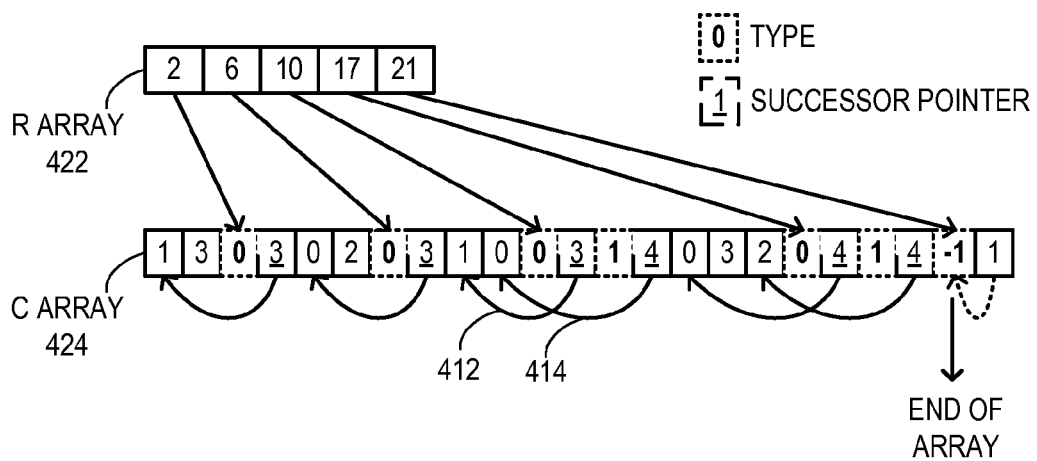
FIG. 4A

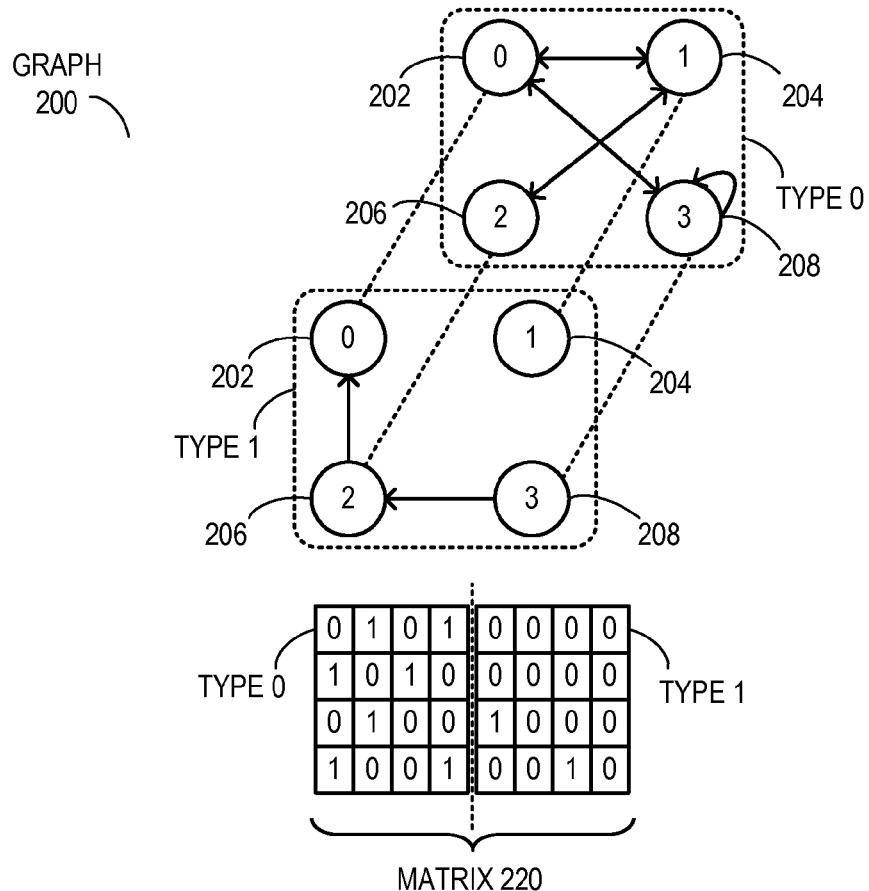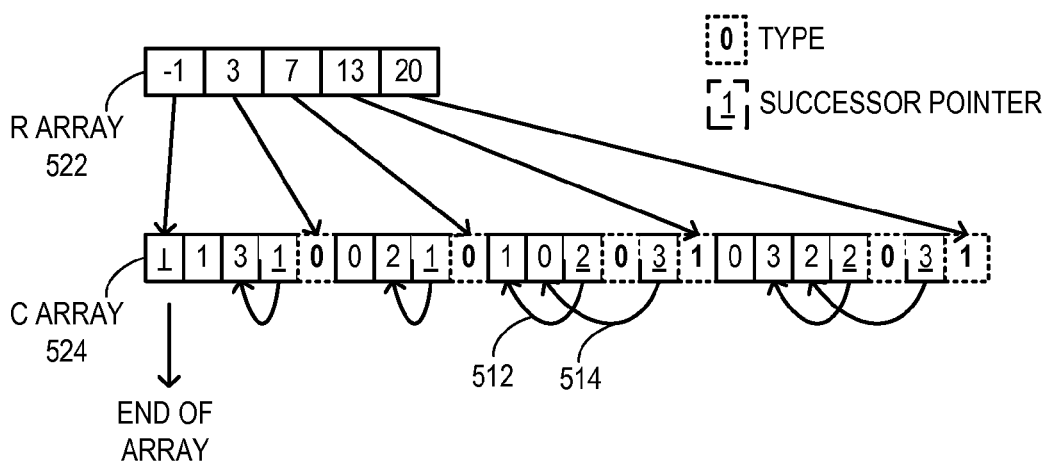
FIG. 5A

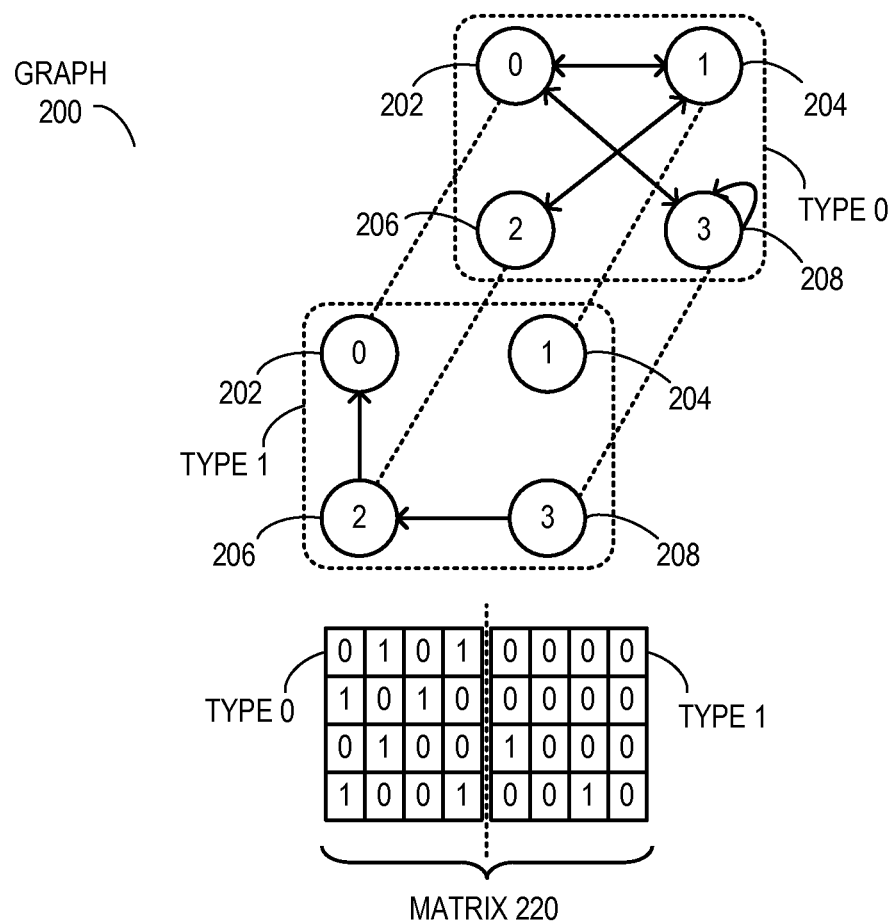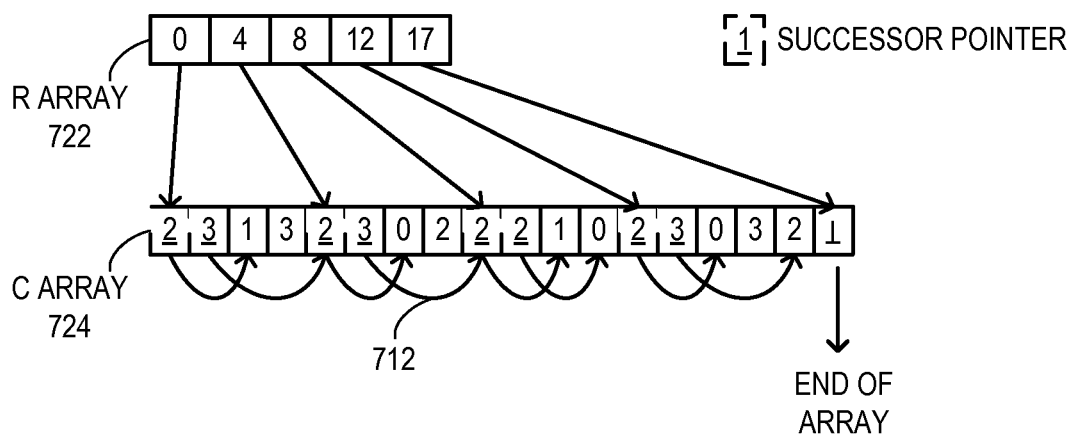
FIG. 7A

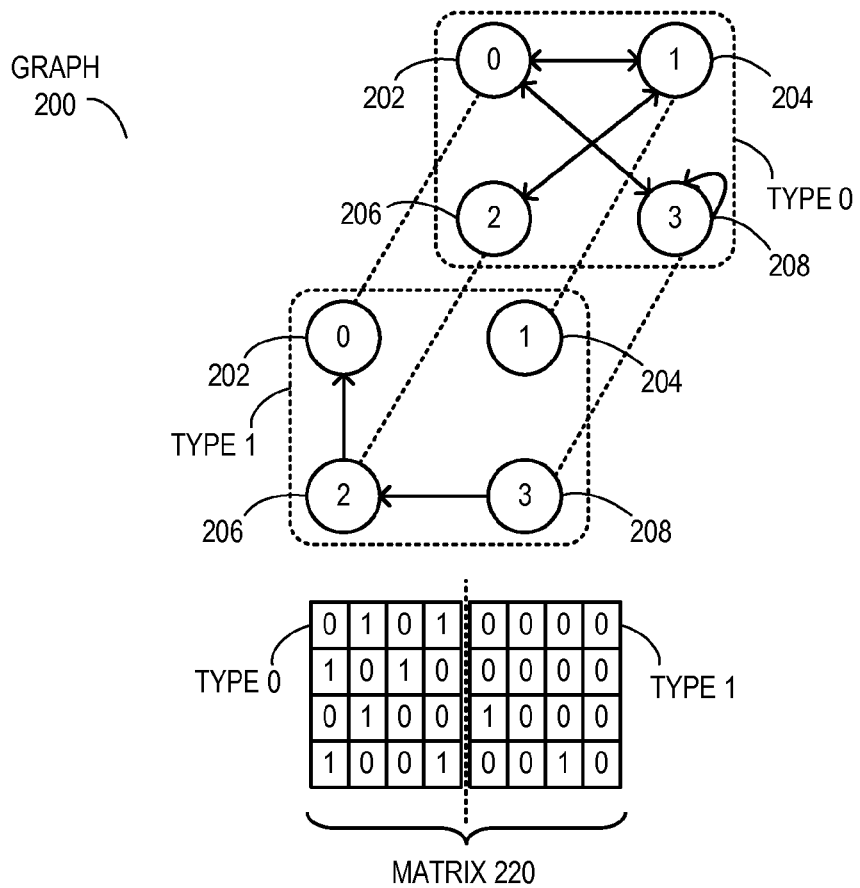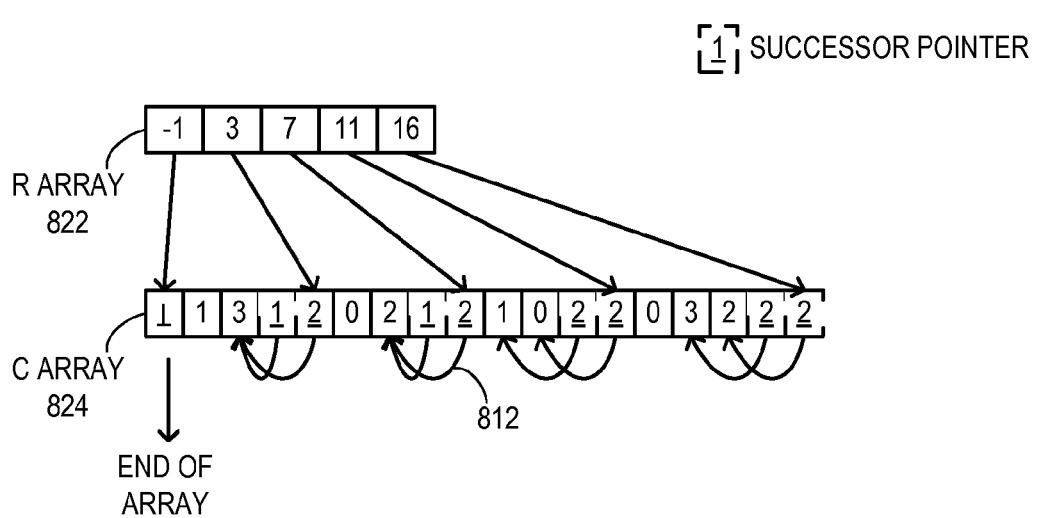
FIG. 8A

EFFICIENT REPRESENTATIONS OF GRAPHS WITH MULTIPLE EDGE TYPES

BACKGROUND

Field

The present disclosure relates to data management. More specifically, the present disclosure relates to a method and system for efficient representation of graphs with multiple edge types.

Related Art

The exponential growth of computing power has made it possible to extract information of interest, such as shopping preferences, social media activities, medical referrals, and e-mail traffic patterns, using efficient data processing. Such data processing requirements have brought with them an increasing demand for efficient computation. As a result, equipment vendors race to build larger and faster computing devices with versatile capabilities, such as graph processing, to calculate information of interest efficiently. However, the computing capability of a computing device cannot grow infinitely. It is limited by physical space, power consumption, and design complexity, to name a few factors. Furthermore, computing devices with higher capability are usually more complex and expensive. More importantly, because an overly large and complex computing device often does not provide economy of scale, simply increasing the capability of a computing device may prove economically unviable.

One way to meet this challenge is to increase the efficiency of graph representations associated with the information of interest. For example, real-world graphs can be large and thus data compression techniques are often used to reduce their memory requirements. A (unweighted) graph can be represented by a (binary) matrix, wherein a respective element of the matrix represents an edge between two vertices (or nodes) corresponding to the row and column numbers of the matrix. However, most real-world graphs are not fully connected. As a result, the number of edges is usually considerably smaller than the number of elements in a matrix. Hence, it is often useful to represent a graph as a sparse matrix that only stores the non-zero entries.

A widely used technique is the compressed sparse row (CSR) format, which uses two one-dimensional arrays to compactly represent the list of neighbors, called the adjacency list, for all vertices of the graph. The CSR format is originally used to represent sparse matrices. CSR encodes the graph in a row-major order, since the edges are stored in a typical array in sequential rows. In an alternative scheme, called compressed sparse column (CSC) format, the edges are stored in a column-major order compactly. CSC supports efficient enumeration of the set of incoming edges to the same vertex in a graph. On the other hand, CSR supports efficient enumeration of the set of outgoing edges originating from the same vertex in the graph.

While graph compression brings many desirable features to data analysis, some issues remain unsolved in efficient representation of graphs with multiple edge types.

SUMMARY

One embodiment of the present invention provides a computing system. The computing system includes a processor and a computer-readable storage medium. The computer-readable storage medium stores instructions which when executed by the processor cause the processor to perform a method. The method comprises obtaining from a first data structure one or more pointers to corresponding elements in a second data structure. A respective vertex of a graph corresponds to an element in the first data structure and the graph supports multiple edge types between respective vertex pairs. The method further comprises obtaining from the second data structure a respective edge type associated with a respective vertex and a respective successor vertex of the edge type and enumerating a respective successor vertex of an edge type of a vertex from the second data structure based on a pointer in an element in the first data structure associated with the vertex.

In a variation on this embodiment, the second data structure includes vertex identifiers of successor vertices, the edge types of the successor vertices are represented based on the location of the vertex identifiers, and the successor vertex is enumerated based on a floor operation and a modulo operation.

In a variation on this embodiment, successors of same edge types of the vertex are represented in a column, the columns representing all edges from the vertex are stored consecutively in the second data structure, and enumerating the successor vertex further comprises identifying start and end indices of successors in the first data structure based on elements in the second data structure.

In a variation on this embodiment, an element of the first data structure points to a Table of Content (ToC) structure, which includes one or more ToC entries, wherein a ToC entry includes an edge type field and a pointer field pointing to a successor of an edge type stored in the second data structure.

In a further variation, the edge type field and the pointer field are stored in consecutive order in the second data structure. Furthermore, enumerating the successor vertex comprises identifying the ToC in the second data structure based on a pointer in an element in the first data structure and identifying respective successors from a first to a last successor of the edge type indicated by the edge type field. The pointer field of the ToC points to the first successor of the edge type of the vertex stored after the ToC.

In a further variation, the edge type field and the pointer field are stored in consecutive order in the second data structure. Furthermore, enumerating the successor vertex comprises identifying the ToC in the second data structure based on a pointer in an element in the first data structure and identifying respective successors from a first to a last successor of the edge type indicated by the edge type field. The pointer field of the ToC points to the first successor of the edge type of the vertex stored before the ToC.

In a further variation, the pointer field and the edge type field are stored in consecutive order in the second data structure. Furthermore, enumerating the successor vertex comprises identifying the ToC in the second data structure based on a pointer in an element in the first data structure and identifying respective successors in decremental order from a last to a first successor of the edge type indicated by the edge type field. The pointer field of the ToC points to the last successor of the edge type of the vertex stored before the ToC.

In a further variation, the method further comprises compressing one or more of the edge type field and the pointer field to a short-range value.

In a further variation, the ToC does not include the edge type field, and the edge type is implicitly encoded based on the location of the pointer field in the second data structure.

In a further variation, source and destination vertices of a respective edge is reversed. The successor vertices of same edge types of a vertex are represented in a column, and the columns representing all edges from the vertex are stored consecutively in the second data structure.

In a further variation, what the pointer field of the ToC points to is determined based on one or more of: i) preferred ToC information, ii) preferred enumeration order, iii) space efficiency, and iv) ToC compression.

In a variation on this embodiment, a successor vertex is enumerated without considering edge types.

BRIEF DESCRIPTION OF THE FIGURES

FIG. 1 illustrates an exemplary architecture of a data processing system, in accordance with an embodiment of the present invention.

FIG. 2A illustrates an exemplary edge-type integrated row-based representation of a graph based on integrated edge types and vertex identifiers, in accordance with an embodiment of the present invention.

FIG. 3A illustrates an exemplary representation of a graph with multiple edge types based on a ToC-first representation in a Multi-Type Compressed Sparse Row (MTCSR) format, in accordance with an embodiment of the present invention.

FIG. 4A illustrates an exemplary representation of a graph with multiple edge types based on a basic ToC-last representation in an MTCSR format, in accordance with an embodiment of the present invention.

FIG. 5A illustrates an exemplary representation of a graph with multiple edge types based on an efficient ToC-last representation in an MTCSR format, in accordance with an embodiment of the present invention.

FIG. 7A illustrates an exemplary representation of a graph with multiple edge types based on an implicitly typed ToC-first representation in an MTCSR format, in accordance with an embodiment of the present invention.

FIG. 8A illustrates an exemplary representation of a graph with multiple edge types based on an implicitly typed ToC-last representation in an MTCSR format, in accordance with an embodiment of the present invention.

In the figures, like reference numerals refer to the same figure elements.

DETAILED DESCRIPTION

Figure 2B:
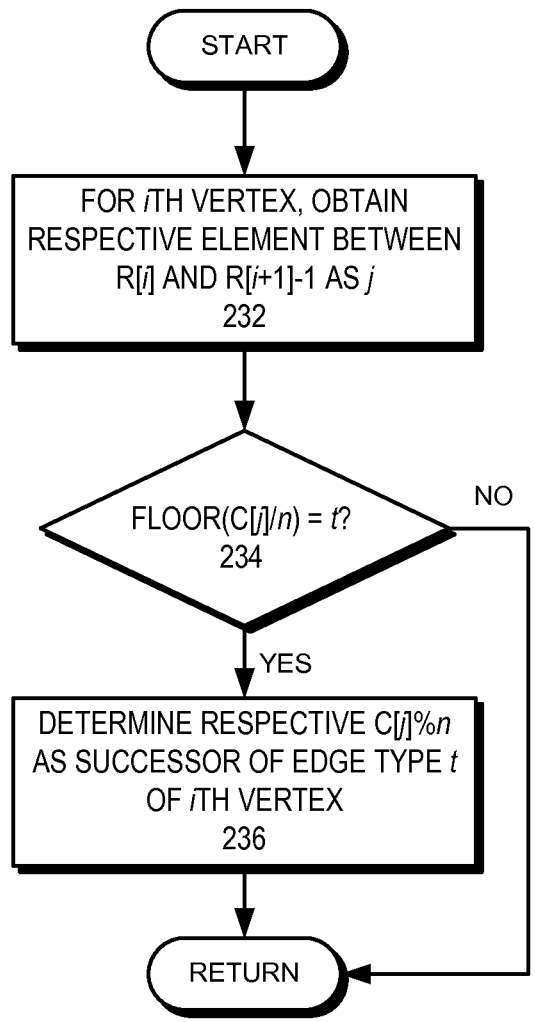
FIG. 2B presents a flowchart illustrating the process of enumerating a vertex's successors of an edge type from an edge-type integrated row-based representation of a graph, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently representing a graph with multiple edge types is solved by using a Table of Content (ToC) which provides an efficient lookup of the first or last successor of an edge type. A successor of a first vertex is a second vertex with which the first vertex shares an edge. Large datasets do not always present meaningful information. For example, social networking activity can present an arbitrary set of data without directly indicating any information of interest, such as a preferred social networking subgraph. One way of obtaining information of interest is by representing the elements in the datasets as vertices in a graph and their multiple types of interrelationships as corresponding types of edges among the vertices. In this disclosure, the terms "vertex" and "node" have been used interchangeably; and the terms "edge" and "link" have been used interchangeably.

Compressed sparse row (CSR) representation of a graph uses two one-dimensional integer arrays. One of the arrays, which is referred to as a C array, stores the column numbers for each of the non-zero entries (i.e., the entries representing the edges) in row-major order. The other array, which is referred to as the R array, stores the indices that mark the beginning of each row represented in the C array. For example, the ith element of the R array stores the array index of C array where the column numbers for row i start. On the other hand, with compressed sparse column (CSC) representation of the graph, the roles of the R and C arrays are switched. The R array stores the row numbers for each non-zero entry in column-major order, and the C array stores the indices that mark the beginning of each column in the R array. For example, the ith element of the C array stores the array index of the R array where the row numbers for column i start.

However, with existing tools, graphs with multiple edge types are not efficiently represented using CSC or CSR, may lead to a memory requirement too large for available computational resources, and thereby may fail to obtain the information of interest in a viable way. CSC or CSR can be further extended based on the Extended Karnaugh Map Representation (EKMR) Compressed Row/Column Storage (ECRS/ECCS). ECRS and ECCS are designed to represent multi-dimensional sparse matrices, thus, they need to be adapted for graphs with multiple edge types for improved storage efficiency.

To solve this problem, in embodiments of the present invention, edge type information of a vertex is represented (or encoded) along with the corresponding vertex identifier. For edge-type integrated row-based representation, the C array includes vertex identifiers of successors in such a way that the associated edge types are encoded along with the vertex identifiers. For the edge-type integrated column-based representation, the rows and columns are arranged such that the same type of edges from the same source vertex are represented in the same column and columns representing all edges from the same source vertex are stored consecutively.

To achieve further improvement in time and/or space efficiently, in embodiments of the present invention, successors of a vertex and their corresponding edge types can be represented by a Multi-Type Compressed Sparse Row (MTCSR) format. In this representation (or encoding), a respective element in array R refers to a Table of Content (ToC) structure, which includes one or more ToC entries. In some embodiments, a ToC entry includes one or more fields. Examples of such fields include, but are not limited to, an edge type and a pointer to the first or last successor associated with the edge type stored in the C array. ToC operates as an efficient lookup table that maps an edge type to the first or the last successor associated with the edge type stored in the C array.

Although examples are discussed herein with respect to a data processing application, embodiments of the present invention may apply the disclosed techniques with any application or apparatus which uses graph representations. In this disclosure, the terms "application" and "software" are used interchangeably. Some embodiments may utilize a relational interface, such as HBase or SQL, instead of Hive. Some of the scripts may be written in C/C++ or other scripting languages, or standard UNIX scripting programs such as cat, join, paste, cut, and sort.

System Architecture

FIG. 1 illustrates an exemplary architecture of a data processing system, in accordance with an embodiment of the present invention. A data processing system 100 may extract data stored according to a relational model (or any other data model) and translate the data to a suitable format representing a graph. The translated data should be appropriate for input to a data processing application (e.g., information of interest detection application). In some embodiments, system 100 can include a set of servers 102A-102E executing as part of a cluster 104. Each of the servers 102A-102E may include software and data stored on a storage device. For example, server 102E may include a storage device 106. Storage device 106 may store data and software such as data processing application 108, transaction data 110, and graph data 112. Data processing application 108 can further include a graph translation module 114. Some implementations may also include a client 116 communicating with servers in cluster 104 to request graph translation services associated with data processing application 108. Note that different implementations of the present invention may include any number of servers and storage devices. Various inventive aspects of system 100 are further described below.

In some embodiments, data processing application 108 accepts its input as a text file formatted in a specific way, with certain constraints and formatting requirements. The input text file should include a description of a graph and other associated data, including the graph topology and data associated with vertices. The graph structure data should be separated from data describing attributes of the vertices and edges. For collaborative filtering, vertices represent customers or products, while edges represent purchase transactions. Graph translation module 114 translates the input data to a suitable format representing a graph, which can include multiple edge types. In some embodiments, graph translation module 114 uses integrated edge type and vertex identifier encoding, and/or ToC structure in MTCSR format to represent the graph. Data processing application 108 enumerates a respective vertex's successors of a respective edge type from the graph representation.

In some embodiments, system 100 utilizes data warehousing software such as Hive built on top of Hadoop. Hive is a data warehouse system for Hadoop. Hive facilitates easy data summarization, ad hoc queries, and the analysis of large datasets residing in distributed storage with Hadoop-compatible file systems. Hive provides a SQL interface to access the stored data. Hadoop Distributed File System (HDFS) is the storage layer. Hadoop is a framework for the distributed processing of large datasets across clusters of machines, pulling together the machines' CPU power. Hadoop provides for storage of data across the clusters, and allows for scaling from a single server to thousands of machines. It provides a scalable distributed file system that spans all the nodes in the clusters. Retailers may store hundreds of gigabytes of data in a Hadoop cluster. One may use Hive with Hadoop and Bash scripting in order to automatically compile data from typical relational database tables into a format appropriate for data processing application 108. Bash is a Unix shell. Bash can read commands from a script file and execute the commands within the script.

Edge-Type Integrated Row- and Column-Based Representations

FIG. 2A illustrates an exemplary edge-type integrated row-based representation of a graph based on integrated edge types and vertex identifiers, in accordance with an embodiment of the present invention. In this example, graph 200 includes vertices 202, 204, 206, and 208 with identifiers 0, 1, 2, and 3, respectively. Graph 200 has directional edges (denoted with arrows) and multiple edge types. For example, vertex 206 (represented by identifier 2) has a type 0 edge with successor vertex (or successor) 204 (represented by identifier 1) and a type 1 edge with successor 202 (represented by identifier 0). Here, types 0 and 1 represent the type of relationship between vertices. Vertex 206's type 0 edge with vertex 204 indicates one type of relationship between vertices 206 and 204, and type 1 edge with vertex 202 indicates another type of relationship between vertices 206 and 202. In this disclosure, the terms "successor vertex" and "successor" are used interchangeably. Graph 200 is represented by binary matrix 220, which includes matrices 212 and 214. In this example, non-zero entries in matrices 212 and 214 represent the type 0 and type 1 edges of graph 200, respectively. For example, a "1" in the first row, second column in matrix 212 indicates that the vertex with identifier 1 (i.e., vertex 204) is a successor of the vertex with identifier 0 (i.e., vertex 202) of a type 0 edge. Similarly, a "1" in the third row, first column in matrix 214 indicates that the vertex with identifier 0 (i.e., vertex 202) is a successor of the vertex with identifier 2 (i.e., vertex 206) of a type 1 edge.

In this representation, the identifiers of the vertices are represented in such a way that the edge type information is encoded along with the original identifiers of vertices. In this example, a respective element in R array 222 corresponds to a respective vertex in graph 200 and points to an element in C array 224. The last element in R array 222 indicates the end of the array. On the other hand, a respective element in C array 224 represents an encoded representation of a successor and its edge type. For example, the element indexed by 2 of R (i.e., R[2]) array 222 corresponds to the vertex with identifier 2, considering the first vertex identifier to be 0. Since that element is 4, it points to the element indexed by 4 of C (i.e., C[4]) array 224, considering the first index to be 0. Similarly, the element indexed by 3 of R array 222, which is 6, corresponds to the vertex with identifier 3 and points to the element indexed by 6 of C array 224. A respective element from the element indexed by 4 till the element indexed by 5 of C array 224 represent two successor vertices and their edge types for the vertex with identifier 2 (i.e., vertex 206).

In some embodiments, a successor vertex $v_i$ (which is represented by an integer identifier of i) of edge type t can be encoded as a virtual vertex $v'_{nt+i}$ (which is represented by a virtual integer identifier of nt+i), where n is the total number of vertices in the graph. In this example, vertex 206, which has an integer identifier of 2, is a successor of an edge of type 1, of vertex 208, which has an integer identifier of 3. This can be encoded as a virtual vertex represented by a virtual identifier 4×1+2=6. To decode the encoded identifier nt+i, a data processing system can use modulo operation ((nt+i) % n) and integer division ($\lfloor (nt+i)/n \rfloor$) to uncover the original identifier i and edge type t, respectively. It should be noted that an integer division can also be referred to as a "floor" operation. For example, virtual identifier 6 can be decoded as 6%4=2 and $\lfloor 6/4 \rfloor$=1 to obtain original vertex identifier 2 and edge type 1.

FIG. 2B presents a flowchart illustrating the process of enumerating a vertex's successors of an edge type from an edge-type integrated row-based representation of a graph, in accordance with an embodiment of the present invention. During operation, for the ith vertex (i.e., the vertex with an integer identifier i), a data processing system obtains a respective element between (and including) R[i] and R[i+1]−1 as j (operation 232) (e.g., using a loop). R[i] indicates the ith indexed element of the R array. In the example in FIG. 2A, R[2] is the second indexed element, considering the starting index to be 0, of R array 222, which is 4. Similarly, R[i+1]−1 for R array 222 is 5. Hence, j takes the values 4 and 5. The system then checks whether the floor of C[j]/n is equal to t (operation 234). C[j] indicates the jth indexed element of the C array. If the floor of C[j]/n is equal to t, the system determines the respective C[j] % n as a successor of edge type t of the ith vertex (operation 236), as described in conjunction with FIG. 2A.

It should be noted that a respective successor can be obtained based on a search (e.g., a linear or a binary search). In some embodiments, such a binary search finds a successor of edge type t such that the successor that immediately precedes it has an edge type less than t, unless it is the first successor of the ith vertex. In this way, compared to a typical binary search, this searching requires one extra read every time the list of successors is bisected. Similarly, to find a respective successor of edge type t, the search reads one successor past the last successor of edge type t, unless it is the last successor of the ith vertex. To speed up modulo and floor operations of the binary search, the system can use n', such that n'>n and is an integer power of 2, to encode and decode the virtual vertex identifiers using the formula i'=n'T+i, because modulo and floor operations against n' become simple bit masking and shifting operations.

FIG. 2B is further elaborated in the pseudocode in Table 1.

TABLE 1

Pseudocode for enumerating a vertex's successors of an edge type from an edge-type integrated row-based representation of a graph.

```
for j = R[i] to R[i+1]−1
    if (⌊C[j] / n⌋ = t) then
        successor ← C[j]%n
    end if
end for
```

Figure 2C:
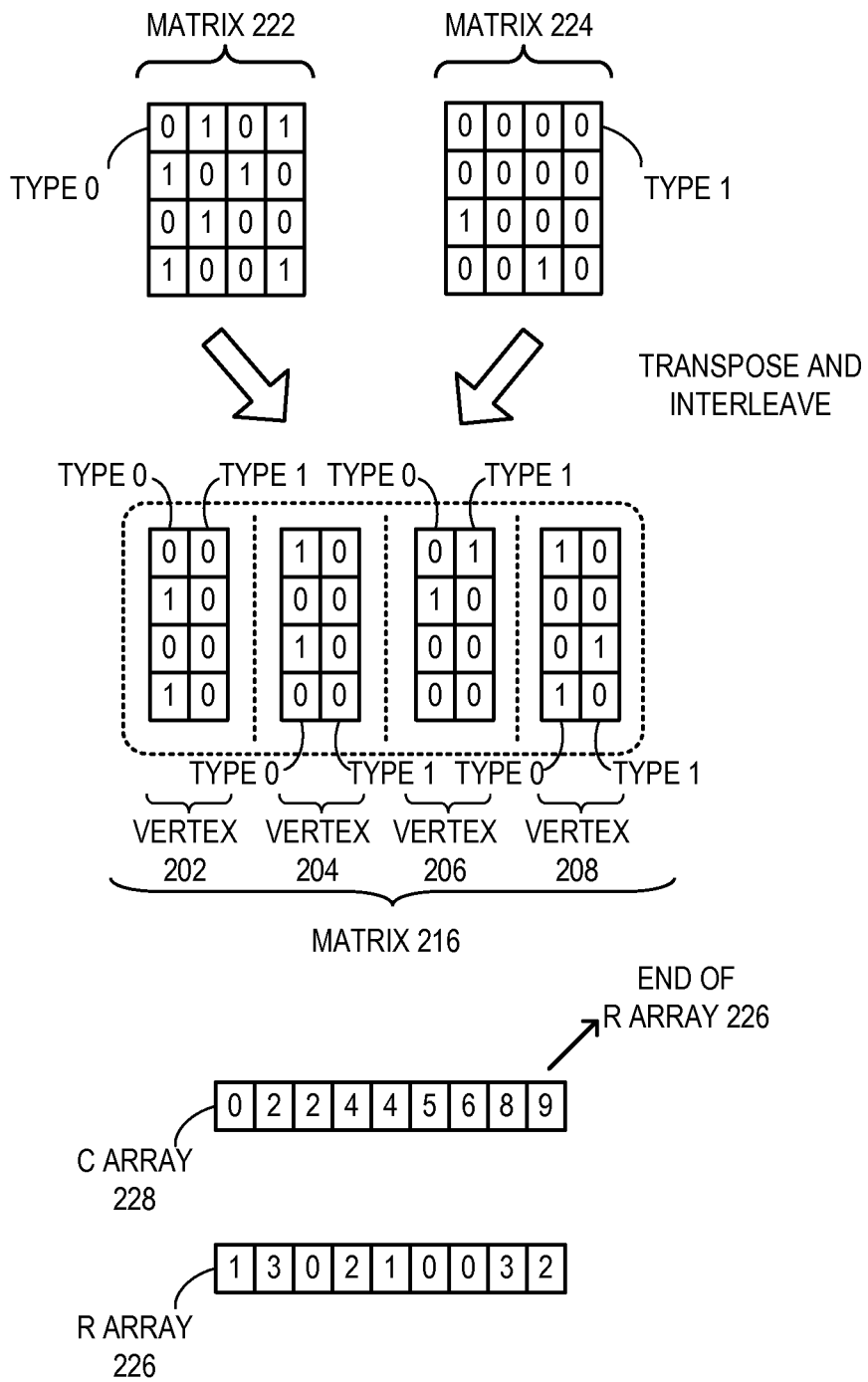
FIG. 2C illustrates an exemplary edge-type integrated column-based representation of a graph based on integrated edge types and vertex identifiers, in accordance with an embodiment of the present invention.

FIG. 2C illustrates an exemplary edge-type integrated column-based representation of a graph based on integrated edge types and vertex identifiers, in accordance with an embodiment of the present invention. For the edge-type integrated column-based representation, a data processing system rearranges the rows and columns of matrix 220 such that the same type of edges from the same source vertex are stored in the same column and the columns representing all edges from the same source vertex are stored consecutively. For example, instead of encoding all the edges of type 0 in matrix 212 and type 1 in matrix 214, a matrix 216 based on an edge-type integrated column-based representation is generated by transposing matrices 212 and 214 independently, and interleaving the columns.

While the basic information stored in matrices 220 and 216 are the same, rows 0, 1, 2, and 3 of matrix 212 becomes columns 0, 2, 4, and 6 of matrix 216, respectively. In matrix 216, every column represents an edge type. For example, column 0 represents the edge type 0 with vertex 202 (represented by identifier 0) as the source vertex, and column 1 represents the edge type 1 with vertex 202 (represented by identifier 0) as the source vertex. The edges originating from vertices 204, 206, and 208 are stored in matrix 216 following the same pattern. Unlike edge-type integrated row-based representation, the system keeps the original identifiers unchanged for the edge-type integrated column-based representation. Instead, edge type information is encoded in C array 228.

To enumerate the successors of edge type t of the ith vertex (i.e., the vertex with identifier i), the edge-type integrated column-based representation uses C[i×T+t] and C[i×T+t+1]−1 as the start and end indices, respectively, of these successors in R array 226. Here, T indicates the total number of edge types (e.g., for graph 200, T=2). To find the successors of edge type 1 of $3^{rd}$ vertex (i.e., vertex 208 with identifier 3), the system computes C[3×2+1]=C[7]=8, and C[3×2+1+1]−1=C[8]−1=9−1=8. Hence, the successors of edge type 1 of the $3^{rd}$ vertex start at index 8 and end at index 8 of R array 226. This is reflected in R array 226, wherein R[8]=2, and the $2^{nd}$ vertex (i.e., vertex 206 with identifier 2) is the only successor of edge type 1 of the $3^{rd}$ vertex.

Figure 2D:
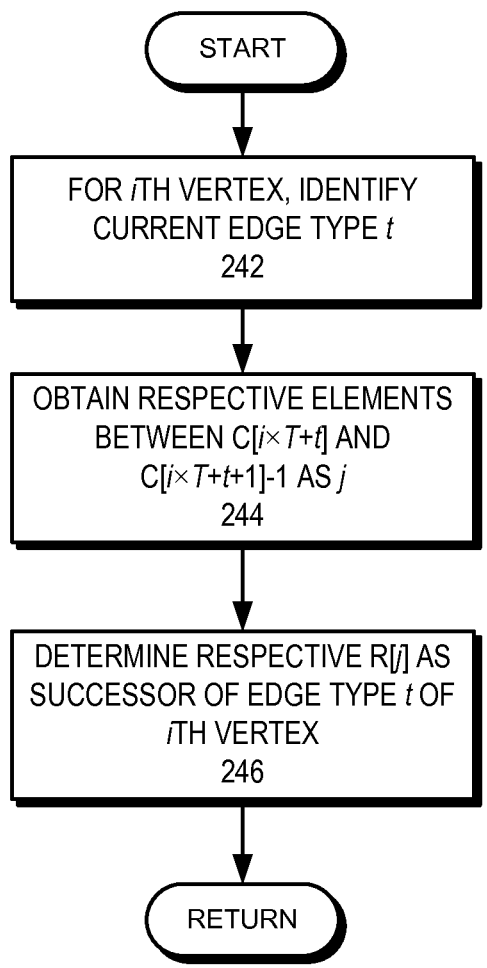
FIG. 2D presents a flowchart illustrating the process of enumerating a vertex's successors of an edge type from an edge-type integrated column-based representation of a graph, in accordance with an embodiment of the present invention.

FIG. 2D presents a flowchart illustrating the process of enumerating a vertex's successors of an edge type from an edge-type integrated column-based representation of a graph, in accordance with an embodiment of the present invention. During operation, for the ith vertex, a data processing system obtains the current edge type t (operation 242) (e.g., from a user input). The system obtains respective elements between C[i×T+t] and C[i×T+t+1]−1 as j (operation 244). In some embodiments, if C[(i+1)×T]>C[i×T], the system obtains respective elements between C[i×T] and C[(i+1)×T]−1 as j. T indicates the total number of edge types. The system then determines respective R[j] as the successor of edge type t of the ith vertex (operation 246).

FIG. 2D is further elaborated in the pseudocode in Table 2.

TABLE 2

Pseudocode for enumerating a vertex's successors of an edge type from an edge-type integrated column-based representation of a graph.

```
for j = C[i×T+t] to C[i×T+t+1]−1
    successor ← R[j]
end for
```

Figure 2E:
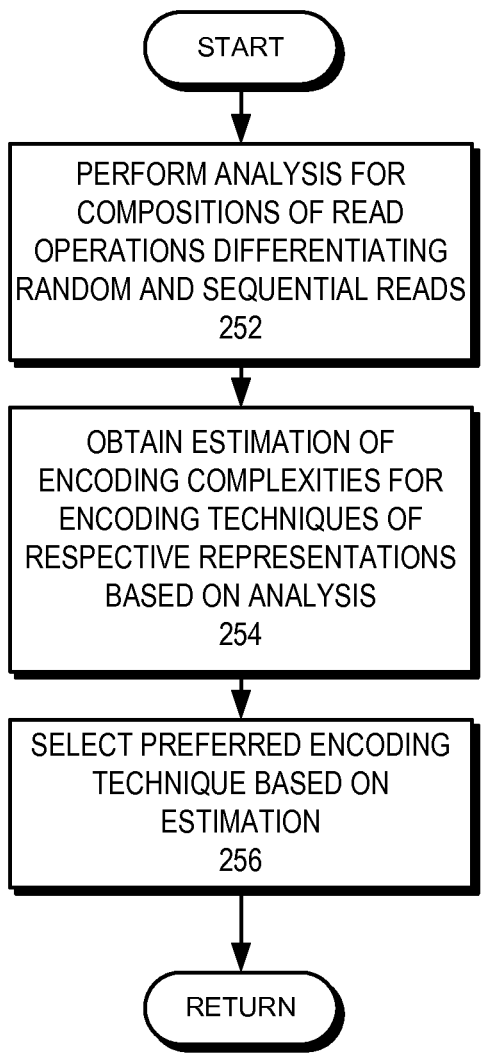
FIG. 2E presents a flowchart illustrating the process of selecting a preferred representation technique for representing a graph, in accordance with an embodiment of the present invention.

FIG. 2E presents a flowchart illustrating the process of selecting a preferred representation technique for representing a graph, in accordance with an embodiment of the present invention. During operation, a data processing system performs analysis for compositions of read operations differentiating random and sequential reads (operation 252). The system then obtains estimation of encoding complexities for encoding techniques of respective representations based on the analysis (operation 254). In some embodiments, the analysis of operation 252 is performed by a user, and the system obtains the estimations of encoding complexities of operation 254 as a user input. The system selects a preferred encoding technique based on the estimation (operation 256).

Runtime Complexities of Edge-Type Integrated Row- and Column-Based Representations It should be noted that the enumerating process can be edge-typed or edge-untyped. An edge-typed traversal only traverses along edges of a specific type, and edge-untyped traversal does not discriminate on the types of edges being traversed. If all edges are deemed traversable regardless of their type, edge-type integrated row- and column-based representations are equally time-efficient. On the other hand, the edge-type integrated column-based representation is more time-efficient if only one type of edges can be traversed at a time.

Let $r_s$ and $r_r$ be the sequential read time and random read time, respectively, for representations of a graph with n vertices and m edges. Let b=min denote the average branching factor (i.e., the average number of outgoing edges from a vertex). The respective runtime complexities of edge-type integrated row- and column-based representations can be expressed in terms of $r_s$, $r_r$, b, n, m, and T. Since graph traversals can be highly random, no locality between either the vertices or the edge types is assumed. The only form of locality which is considered is the set of successors of the same edge type from the same source vertex, since they are represented consecutively in the C array of the edge-type integrated row-based representations and in the R array of the edge-type integrated column-based representations. The runtime complexities are derived based on the assumption that there is no inter-vertex or inter-edge-type exploration locality in the graph traversal.

Edge-Type Integrated Row-Based Representation with Edge-Typed Enumeration:

To enumerate the successors of an average vertex $v_i$ with b successors, of which b/T successors are reachable along a specific edge type t, using edge-type integrated row-based representation, accessing R[i] triggers one random read ($r_r \times 1$), and accessing R[i+1] triggers one sequential read ($r_s \times 1$). Suppose that a variant of binary search is used to find the first successor of edge type t in the C array, which triggers $\log_2 b$ random reads and $\log_2 b$ sequential reads ($r_r \times \log_2 b + r_s \times \log_2 b$). Accessing the remaining successors of edge type t and one successor past the last successor of edge type t in the C array triggers b/T sequential reads ($r_s \times b/T$).

Thus, the runtime for enumerating the successors of edge type t of an average vertex using edge-type integrated row-based representation is: $r_r \times 1 + r_s \times 1 + r_r \times \log_2 b + r_s \times \log_2 b + r_s \times b/T = r_r \times (1 + \log_2 b) + r_s \times (1 + \log_2 b + b/T)$. Let $b_i$ be the number of successors for vertex $v_i$ and let $b_{it}$ be the number of successors of type t for vertex $v_i$. To enumerate the successors for all vertices and all edge types (with no inter-vertex or inter-edge-type exploration locality), the runtime complexity becomes:

$$\sum_{t=1}^{T}\sum_{i=1}^{n}[r_r(1+\log_2 b_i)+r_s(1+\log_2 b_i+b_{it})] = \sum_{t=1}^{T}\sum_{i=1}^{n} r_r +$$

$$r_r\sum_{t=1}^{T}\sum_{i=1}^{n}\log_2 b_i + \sum_{t=1}^{T}\sum_{i=1}^{n} r_s + r_s\sum_{t=1}^{T}\sum_{i=1}^{n}\log_2 b_i + r_s\sum_{t=1}^{T}\sum_{i=1}^{n} b_{it}.$$

Because $$\sum_{i=1}^{n} b_i = m$$

and $\log_2(x)$ is concave, Jensen's inequality can be applied as $$\sum_{i=1}^{n}\log_2 b_i \leq n\log_2\frac{\sum_{i=1}^{n} b_i}{n} = n\log_2\frac{m}{n} = n\log_2 b.$$

-continued $$\text{Since} \sum_{t=1}^{T} \sum_{i=1}^{n} b_{it} = m,$$

$$\sum_{t=1}^{T} \sum_{i=1}^{n} r_r + r_r \sum_{t=1}^{T} \sum_{i=1}^{n} \log_2 b_i + \sum_{t=1}^{T} \sum_{i=1}^{n} r_s + r_s \sum_{t=1}^{T} \sum_{i=1}^{n} \log_2 b_i +$$

$$r_s \sum_{t=1}^{T} \sum_{i=1}^{n} b_{it} \leq r_r nT + r_r \sum_{t=1}^{T} n\log_2 b + r_s nT + r_s \sum_{t=1}^{T} n\log_2 b + r_s m =$$

$$r_r nT + r_r nT\log_2 b + r_s nT + r_s nT\log_2 b + r_s m =$$

$$r_r(1 + \log_2 b)nT + r_s(1 + \log_2 b)nT + r_s m.$$

Edge-Type Integrated Row-Based Representation with Edge-Untyped Enumeration:

This entails enumerating the list of neighbors reachable from an average vertex $v_i$ with b successors regardless of the edge type. For edge-untyped traversals on edge-type integrated row-based representation, accessing R[i] triggers one random read ($r_r \times 1$), and accessing R[i+1] triggers one sequential read ($r_s \times 1$). Accessing the first successor in the C array triggers one random read ($r_r \times 1$), and accessing the remaining successors in the C array triggers (b−1) sequential reads ($r_s \times (b-1)$). Thus, the runtime for enumerating the successors of an average vertex is: $r_r \times 1 + r_s \times 1 + r_r \times 1 + r_s \times (b-1) = r_r \times 2 + r_s \times b$. Hence, the total runtime for enumerating the successors for all n vertices in the graph is: $(r_r \times 2 + r_s \times b) \times n = r_r \times 2n + r_s \times b \times n = r_r \times 2n + r_s \times m$. It can be observed that there are twice as many random reads as there are vertices, and there are the same number of sequential reads as there are edges.

Edge-Type Integrated Column-Based Representation with Edge-Typed Enumeration:

To enumerate the successors of an average vertex $v_i$ with b successors, of which b/T successors are reachable along a specific edge type t, using edge-type integrated column-based representation, accessing C[i×T+t] triggers one random read ($r_r \times 1$), and accessing C[i×T+t+1] triggers one sequential read ($r_s \times 1$). Accessing the first successor of edge type t in the R array triggers one random read ($r_r \times 1$). Accessing the remaining successors of edge type t in the R array triggers b/T−1 sequential reads ($r_s \times (b/T-1)$). Thus, the runtime for enumerating the successors of edge type t of an average vertex using the edge-type integrated column-based representation is: $r_r \times 1 + r_s \times 1 + r_r \times 1 + r_s \times (b/T-1) = r_r \times 2 + r_s \times b/T$. Hence, the total runtime of enumerating the successors for all n vertices and all T edge types in the graph is: $(r_1 \times 2 + r_s \times b/T) \times nT = r_r \times 2nT + r_s \times b \times n = r_r \times 2nT + r_s \times m$.

Edge-Type Integrated Column-Based Representation with Edge-Untyped Enumeration:

A basic algorithm for edge-untyped traversals would iterate over all the edge types to enumerate the successors of a vertex, which would produce the runtime complexity as: $r_r \times 2T + r_s \times b$ for enumerating the successors of an average vertex and $r_r \times 2n \times T + r_s \times m$ for enumerating the successors of all the vertices. However, there exists a more efficient algorithm for enumerating these successors without explicitly iterating over the edge types. If C[(i+1)×T]>C[i×T], a respective j can be obtained from respective elements between C[i×T] and C[(i+1)×T]−1, as described in conjunction with FIG. 2D. Since edges of different types from the same source vertex are stored consecutively in the R array, only finding the start of edges of the first edge type and the end of edges of the last edge type is needed. All the other edges fall within these two end points. This produces the runtime complexity as: $r_r \times 2 + r_s \times b$ for enumerating the successors of an average vertex and $r_r \times 2n + r_s \times m$ for enumerating the successors of all the vertices.

Table 3 summarizes the runtime complexity results of the edge-type integrated row- and column-based representations for edge-typed and edge-untyped traversals.

TABLE 3

Runtime complexities of edge-type integrated row- and column-based representations.

| | Edge-type integrated row-based | Edge-type integrated column-based |
|---|---|---|
| Edge-typed | $r_r \times (1 + \log_2 b)n \times T + r_s \times (1 + \log_2 b)n \times T + r_s \times m$ | $r_r \times 2n\,T + r_s \times m$ |
| Edge-untyped | $r_r \times 2n + r_s \times m$ | $r_r \times 2n + r_s \times m$ |

ToC-First Representation in MTCSR

The edge-type integrated row-based representation of a graph is more space-efficient than the edge-type integrated column-based representation. On the other hand, the edge-type integrated column-based representation is more time-efficient for edge-typed traversals. To achieve a further improvement in the time-space tradeoff, embodiments of the present invention can represent a graph in an MTCSR format. In this format, each element of the R array refers to a ToC structure, which includes one or more ToC entries. The ToC entry can include one or more fields. Examples of a field include, but are not limited to, an edge type and a pointer to the first or the last successor of an edge type stored in the C array. ToC operates as an efficient lookup table that maps an edge type to the first or the last successor of an edge type.

In some embodiments, ToCs can reside outside of the C array and achieve their mapping functions. However, including ToCs in the C array can reduce pointer sizes, because ToCs can use short pointers to locate the successors stored in the same C array, and can have fewer cache misses because ToCs are stored close to the contents they point to. There are multiple ways to integrate the ToCs with the list of successors they point to inside the C array. For example, a ToC structure for a respective vertex can appear before the list of successors of the vertex. This is referred to as the ToC-first representation. A ToC structure for a respective vertex can also appear after the list of successors of the vertex. This is referred to as the ToC-last representation.

FIG. 3A illustrates an exemplary representation of a graph with multiple edge types based on a ToC-first representation in an MTCSR format, in accordance with an embodiment of the present invention. In this example, matrix 220 is represented in a ToC-first representation based on R array 322 and C array 324. The pointer and the edge type fields of a ToC entry for a vertex point to the first successor of the corresponding edge type of the vertex. The numbers in array elements representing the edge types are in boldface and denoted with dotted lines. The numbers in array elements representing the pointers are underlined and denoted with dashed lines. In this example, the value of a pointer is set to the relative position difference between the pointer and the pointee. In some embodiments, the end of the array, as denoted by a "1" symbol, is not explicitly stored in C array 324.

For example, the ToC for the $2^{nd}$ vertex (i.e., vertex 206 with identifier 2) is pointed to by R[2], which is in C[8]. The first element C[8] in the ToC indicates a type 0 edge type. It is immediately followed by a pointer in C[9], which indicates that the first type 0 successor of vertex 206 is 3 positions away. To get the position of this successor, the value of the pointer can be added to the current position (which is 9). In this case, a pointer value of 3 means the first type 0 successor of vertex 206 is the $3^{rd}$ element after this pointer, as shown by curved arrow 312. The $3^{rd}$ element after C[9] is C[12], which includes the identifier 1 corresponding to the successor vertex 204.

The next element in the ToC is C[10], which indicates a type 1 edge type. It is immediately followed by a pointer in C[11], which indicates that the first type 1 successor of vertex 206 is 2 positions away. To get the position of this successor, the value of the pointer can be added to the current position (which is 11). In this case, a pointer value of 2 means the first type 1 successor of vertex 206 is the $2^{nd}$ element after this pointer, as shown by curved arrow 314. The $2^{nd}$ element after C[11] is C[13], which includes the identifier 0 corresponding to successor vertex 202.

In this way, finding the list of successors of edge type t of vertex $v_i$ (i.e., a vertex with identifier i) includes enumerating the ToC entries of vertex $v_i$ until an entry with a matching edge type field is found. In ToC-first representation, the ToC of $v_i$ is stored before all the successors of $v_i$. This encoding entails that the end of the ToC is immediately followed by the first successor of the first edge type, which marks the end of the ToC. Thus, no explicit end-of-ToC marker in the C array is needed. Similarly, if edge types $t_1$ and $t_2$ are stored consecutively in the ToC, the last successor of edge type $t_1$ is immediately followed by the first successor of edge type $t_2$. Thus, no explicit end-of-successor marker in the C array is needed. This also includes the last edge type t in the ToC, which is followed immediately by the ToC structure of the next vertex $v_{i+1}$.

Figure 3B:
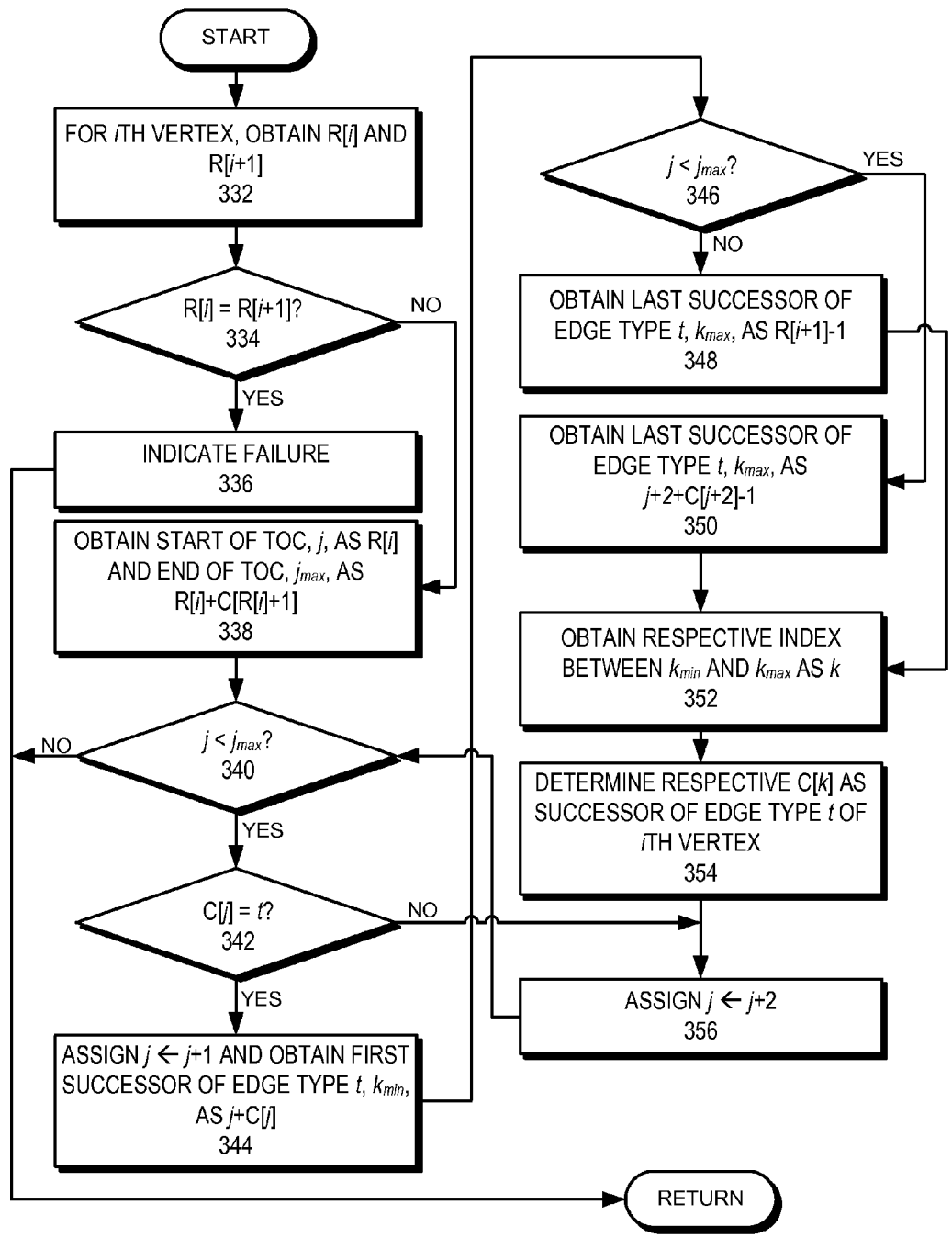
FIG. 3B presents a flowchart illustrating the process of enumerating a vertex's successors of an edge type from a ToC-first representation of a graph with multiple edge types, in accordance with an embodiment of the present invention.

FIG. 3B presents a flowchart illustrating the process of enumerating a vertex's successors of an edge type from a ToC-first representation of a graph with multiple edge types, in accordance with an embodiment of the present invention. This enumeration is edge-typed. During operation, for the ith vertex (i.e., a vertex with identifier i), a data processing system obtains R[i] and R[i+1] (operation 332) and checks whether R[i] is equal to R[i+1] (operation 334). If R[i] is equal to R[i+1], the ith vertex does not have any successor. The system then indicates a failure (operation 336). In some embodiments, this indication can include a message stating that the ith vertex does not have any successor. If R[i] is not equal to R[i+1], the system obtains the start of the ToC, j, as R[i] and the end of the ToC, $j_{max}$, as R[i]+C[R[i]+1] (operation 338).

The system checks, for a loop, whether j is less than $j_{max}$ (operation 340). If not, the system has completed enumerating the successors of the ith vertex. Otherwise, the system checks whether C[j] is equal to t (operation 342). If C[j] is equal to t, the system assigns j←j+1 (i.e., increments j) and obtains the first successor of edge type t, $k_{min}$, as j+C[j] (operation 344). The system then checks, for a condition, whether j is less than $j_{max}$ (operation 346). If j is not less than $j_{max}$ (e.g., is greater than or equal to $j_{max}$), the system obtains the last successor of edge type t, $k_{max}$, as R[i+1]−1 (operation 348). Otherwise, the system obtains the last successor of edge type t, $k_{max}$, as j+2+C[j+2]−1 (operation 350). After obtaining $k_{max}$ (operations 348 and 350), the system obtains a respective index between $k_{min}$ and $k_{max}$ as k (operation 352) and determines the respective C[k] as a successor of edge type t of the ith vertex (operation 354). If C[j] is not equal to t (operation 342) or successors of edge type t have been determined (operation 354), the system assigns j←j+2 (operation 356) and continues to check, for the loop, whether j is less than $j_{max}$ (operation 340).

FIG. 3B is further elaborated in the pseudocode in Table 4.

TABLE 4

Pseudocode for enumerating a vertex's successors of an edge type from a ToC-first representation of a graph with multiple edge types.

```
if (R[i] = R[i+1]) then return failure
j ← R[i]
j_max ← R[i]+C[R[i]+1]
while (j < j_max)
    if (C[j] = t) then
        j ← j + 1
        k_min ← j + C[j]
        if (j < j_max) then
            k_max ← j+2+C[j+2]−1
        else
            k_max ← R[i+1]−1
        end if
        for k = k_min to k_max
            successor ← C[k]
        end for
        return success
    end if
    j ← j+2
end while
return failure
```

Figure 3C:
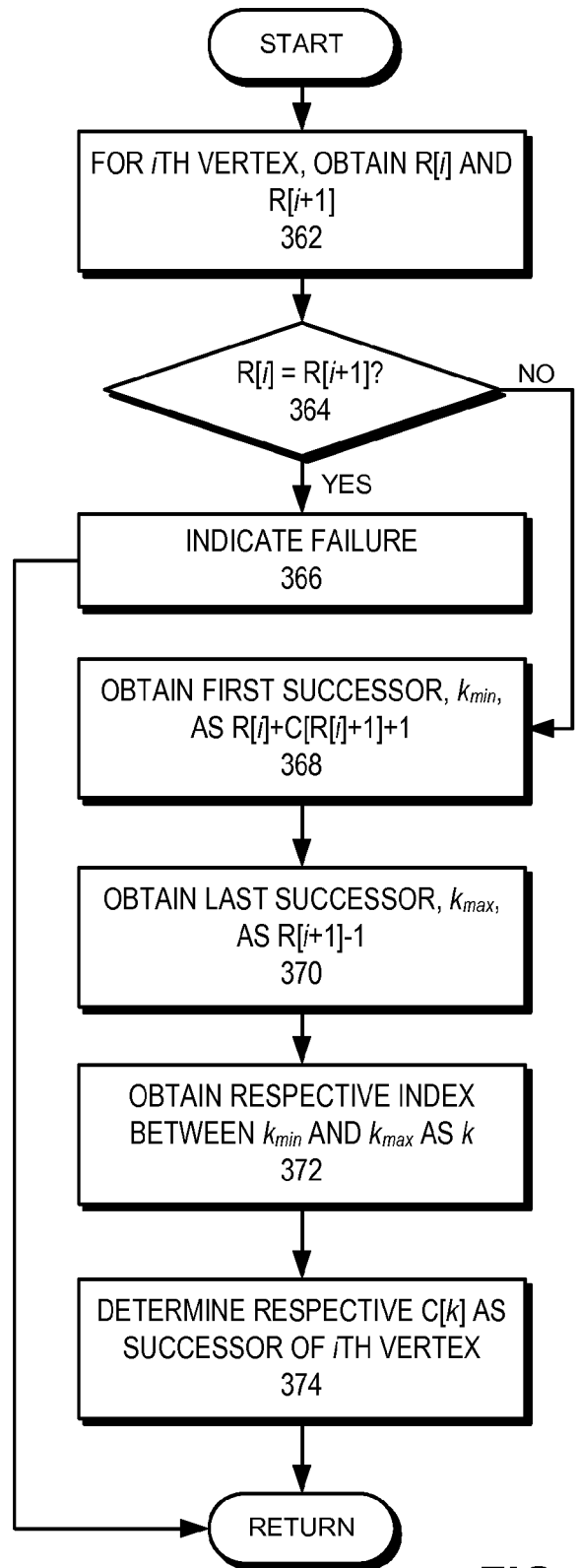
FIG. 3C presents a flowchart illustrating the process of enumerating all successors of a vertex from a ToC-first representation of a graph, in accordance with an embodiment of the present invention.

FIG. 3C presents a flowchart illustrating the process of enumerating all successors of a vertex from a ToC-first representation of a graph, in accordance with an embodiment of the present invention. This enumeration is edge-untyped. During operation, for the ith vertex (i.e., a vertex with identifier i), a data processing system obtains R[i] and R[i+1] (operation 362) and checks whether R[i] is equal to R[i+1] (operation 364). If R[i] is equal to R[i+1], the ith vertex does not have any successor. The system then indicates a failure (operation 366). In some embodiments, this indication can include a message stating that the ith vertex does not have any successor. If R[i] is not equal to R[i+1], the system obtains the first successor, $k_{min}$, as R[i]+C[R[i]+1]+1 (operation 368) and the last successor, $k_{max}$, as R[i+1]−1 (operation 370). The system then obtains a respective index between $k_{min}$ and $k_{max}$ as k (operation 372) and determines the respective C[k] as a successor of the ith vertex (operation 374).

FIG. 3C is further elaborated in the pseudocode in Table 5.

TABLE 5

Pseudocode for enumerating all successors of a vertex from a ToC-first representation of a graph with multiple edge types.

```
if (R[i] = R[i+1]) then return failure
k_min ← R[i]+C[R[i]+1] + 1
k_max ← R[i+1]−1
for k = k_min to k_max
    successor ← C[k]
end for
```

Runtime Complexity of ToC-First Representation in MTCSR

For Edge-Typed Enumeration:

To enumerate the successors of an average vertex $v_i$ with b successors, of which b/T successors are reachable along a specific edge type t, accessing R[i] triggers one random read $(r_r \times 1)$, accessing R[i+1] triggers one sequential read $(r_s \times 1)$, and accessing C[R[i]+1] triggers one random read $(r_r \times 1)$. Furthermore, using binary search to find a corresponding ToC entry triggers $\log_2 T$ random reads ($r_r \times \log_2 T$), obtaining the pointer field of the matching ToC entry triggers one sequential read ($r_s \times 1$), and obtaining the index of the last successor of edge type t in the C array triggers one sequential read ($r_s \times 1$). Moreover, following the pointer to obtain the first successor of edge type t in the C array triggers one random read ($r_r \times 1$), and accessing the remaining successors of edge type t triggers (b/T−1) sequential reads ($r_s \times (b/T-1)$).

Thus, the runtime for enumerating the successors of edge type t of an average vertex $v_i$ using ToC-first representation is:

$$r_r \times 1 + r_s \times 1 + r_r \times 1 + r_r \times \log_2 T + r_s \times 1 + r_s \times 1 + r_r \times 1 + r_s \times (b/T-1) = r_r \times (3+\log_2 T) + r_s \times (2+b/T).$$

Hence, the total runtime for enumerating the successors for all n vertices and all T edge types in the graph is:

$$(r_r \times (3+\log_2 T) + r_s \times (2+b/T)) \times n \times T = r_r \times (3+\log_2 T) \times n \times T + r_s \times (2n \times T + m).$$

For Edge-Untyped Enumeration:

To enumerate the successors of an average vertex $v_i$ with b successors regardless of the edge type, accessing R[i] triggers one random read ($r_r \times 1$), accessing R[i+1] triggers one sequential read ($r_s \times 1$), and accessing C[R[i]+1] triggers one random read ($r_r \times 1$). Furthermore, accessing the first successor in the C array triggers one random read ($r_r \times 1$) and accessing the remaining successors triggers (b−1) sequential reads ($r_s \times (b-1)$).

Thus, the runtime for enumerating the successors of an average vertex $v_i$ using ToC-first representation is:

$$r_r \times 1 + r_s \times 1 + r_r \times 1 + r_r \times 1 + r_s \times (b-1) = r_r \times 3 + r_s \times b.$$

Hence, the total runtime for enumerating the successors for all n vertices in the graph is:

$$(r_r \times 3 + r_s \times b) \times n = r_r \times 3n + r_s \times bn$$
$$= r_r \times 3n + r_s \times m.$$

Basic ToC-Last Representation in MTCSR

FIG. 4A illustrates an exemplary representation of a graph with multiple edge types based on a basic ToC-last representation in an MTCSR format, in accordance with an embodiment of the present invention. In this example, matrix 220 is represented in a basic ToC-last representation based on R array 422 and C array 424. The pointer field of a ToC entry for a vertex and a corresponding edge type points to the first successor of the edge type of the vertex. The numbers in array elements representing the edge types are in boldface and denoted with dotted lines. The numbers in array elements representing the pointers are underlined and denoted with dashed lines. In this example, the value of a pointer is set to be the relative position difference between the pointer and the pointee.

For example, the ToC for the $2^{nd}$ vertex (i.e., vertex 206 with identifier 2) is pointed to by R[2], which is in C[10]. The first element C[10] in the ToC indicates a type 0 edge type. It is immediately followed by a pointer in C[11], which indicates that the first type 0 successor of vertex 206 is 3 positions before. To get the position of this successor, the value of the pointer can be subtracted from the current position (which is 11). In this case, a pointer value of 3 means the first type 0 successor of vertex 206 is the $3^{rd}$ element before this pointer, as shown by curved arrow 412. The $3^{rd}$ element before C[11] is C[8], which includes the identifier 1 corresponding to successor vertex 204.

The next element in the ToC is C[12], which indicates a type 1 edge type. It is immediately followed by a pointer in C[13], which indicates that the first type 1 successor of vertex 206 is 4 positions before. To get the position of this successor, the value of the pointer can be subtracted from the current position (which is 11). In this case, a pointer value of 4 means the first type 1 successor of vertex 206 is the $4^{th}$ element before this pointer, as shown by curved arrow 414. The $4^{th}$ element before C[13] is C[9], which includes the identifier 0 corresponding to successor vertex 202.

Basic ToC-last representation includes the ToC of vertex $v_i$ after the successors of vertex $v_i$. As a result, the last successor of the last edge type is immediately followed by the start of the ToC. Thus, no explicit end-of-successor marker in the C array is needed. Similarly, the end of a ToC is followed by the first successor of the first type of the next vertex $v_{i+1}$. Thus, except for the last vertex $v_{n-1}$, no explicit end-of-ToC marker in the C array is needed. For the last vertex $v_{n-1}$, the ToC is immediately followed by a dummy ToC of edge type −1. The value of the dummy ToC is determined in such a way that it points to the immediate next position after the end of the previous ToC, as shown by a dotted curved arrow, as the end-of-ToC marker for the last vertex 208. It should be noted that a dummy ToC to mark the end of the last vertex in ToC-first representation is not needed because the last element of the R array (e.g., R[4] of R array 322 in FIG. 3A) points to it.

Figure 4B:
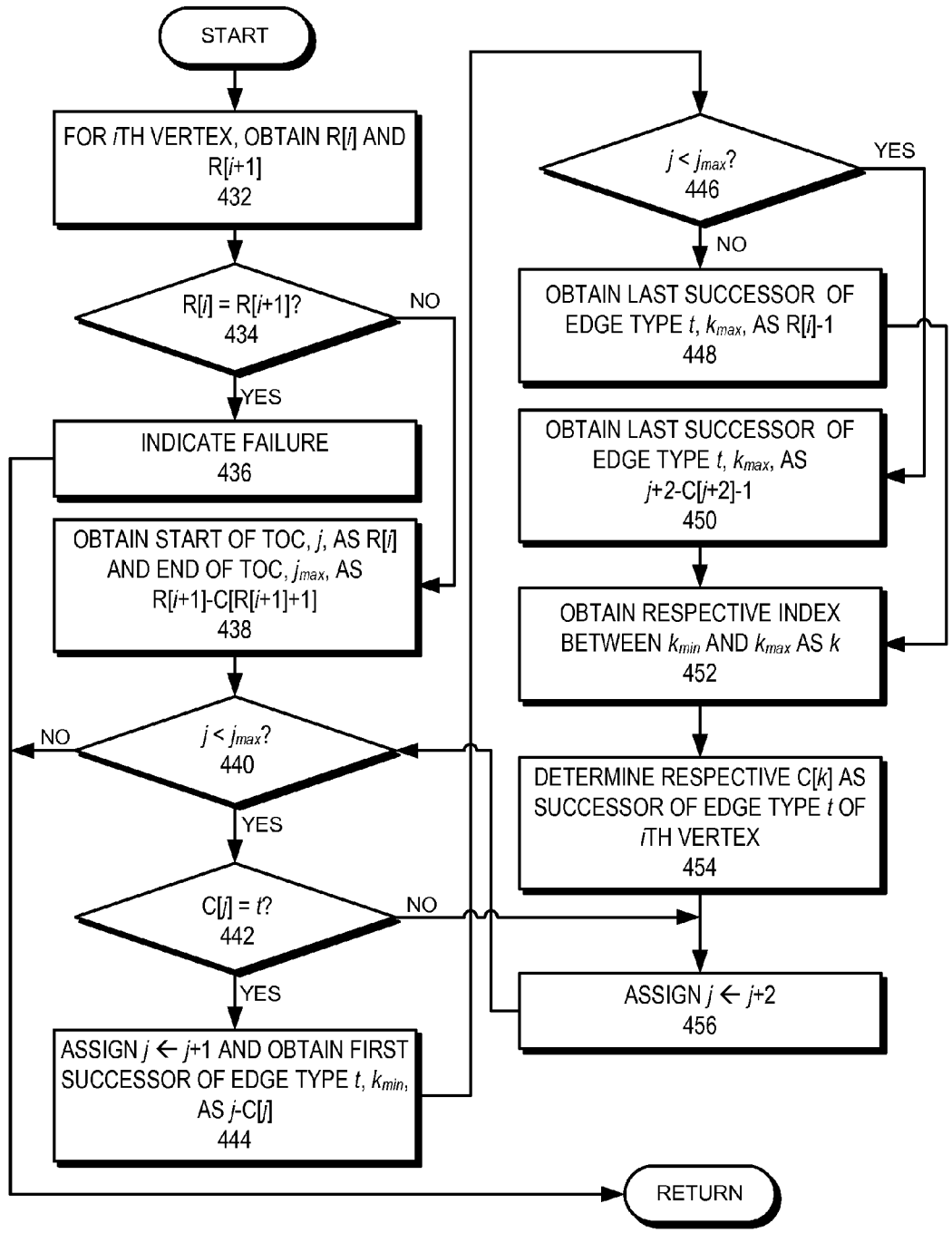
FIG. 4B presents a flowchart illustrating the process of enumerating a vertex's successors of an edge type from a basic ToC-last representation of a graph with multiple edge types, in accordance with an embodiment of the present invention.

FIG. 4B presents a flowchart illustrating the process of enumerating a vertex's successors of an edge type from a basic ToC-last representation of a graph with multiple edge types, in accordance with an embodiment of the present invention. This enumeration is edge-typed. During operation, for the ith vertex (i.e., a vertex with identifier i), a data processing system obtains R[i] and R[i+1] (operation 432) and checks whether R[i] is equal to R[i+1] (operation 434). If R[i] is equal to R[i+1], the ith vertex does not have any successor. The system then indicates a failure (operation 436). In some embodiments, this indication can include a message stating that the ith vertex does not have any successor. If R[i] is not equal to R[i+1], the system obtains the start of the ToC, j, as R[i] and the end of the ToC, $j_{max}$, as R[i+1]−C[R[i+1]+1] (operation 438).

The system checks, for a loop, whether j is less than $j_{max}$ (operation 440). If not, the system has completed enumerating the successors of the ith vertex. Otherwise, the system checks whether C[j] is equal to t (operation 442). If C[j] is equal to t, the system assigns j←j+1 (i.e., increments j) and obtains the first successor of edge type t, $k_{min}$, as j−C[j] (operation 444). The system then checks, for a condition, whether j is less than $j_{max}$ (operation 446). If j is not less than $j_{max}$ (e.g., is greater than or equal to $j_{max}$), the system obtains the last successor of edge type t, $k_{max}$, as R[i]−1 (operation 448). Otherwise, the system obtains the last successor of edge type t, $k_{max}$, as j+2−C[j+2]−1 (operation 450). After obtaining $k_{max}$ (operations 448 and 450), the system obtains a respective index between $k_{min}$ and $k_{max}$ as k (operation 452) and determines the respective C[k] as a successor of edge type t of the ith vertex (operation 454). If C[j] is not equal to t (operation 442) or successors of edge type t have been determined (operation 454), the system assigns j←j+2 (operation 456) and continues to check, for the loop, whether j is less than $j_{max}$ (operation 440).

FIG. 4B is further elaborated in the pseudocode in Table 6.

TABLE 6

Pseudocode for enumerating a vertex's successors of an edge type from a basic ToC-last representation of a graph with multiple edge types.

```
if (R[i] = R[i+1]) then return failure
j ← R[i]
j_max ← R[i+1]−C[R[i+1]+1]
while (j < j_max)
    if (C[j] = t) then
        j ← j+1
        k_min ← j−C[j]
        if (j < j_max) then
            k_max ← j+2−C[j+2]−1
        else
            k_max ← R[i]−1
        end if
        for k = k_min to k_max
            successor ← C[k]
        end for
        return success
    end if
    j ← j+2
end while
return failure
```

Figure 4C:
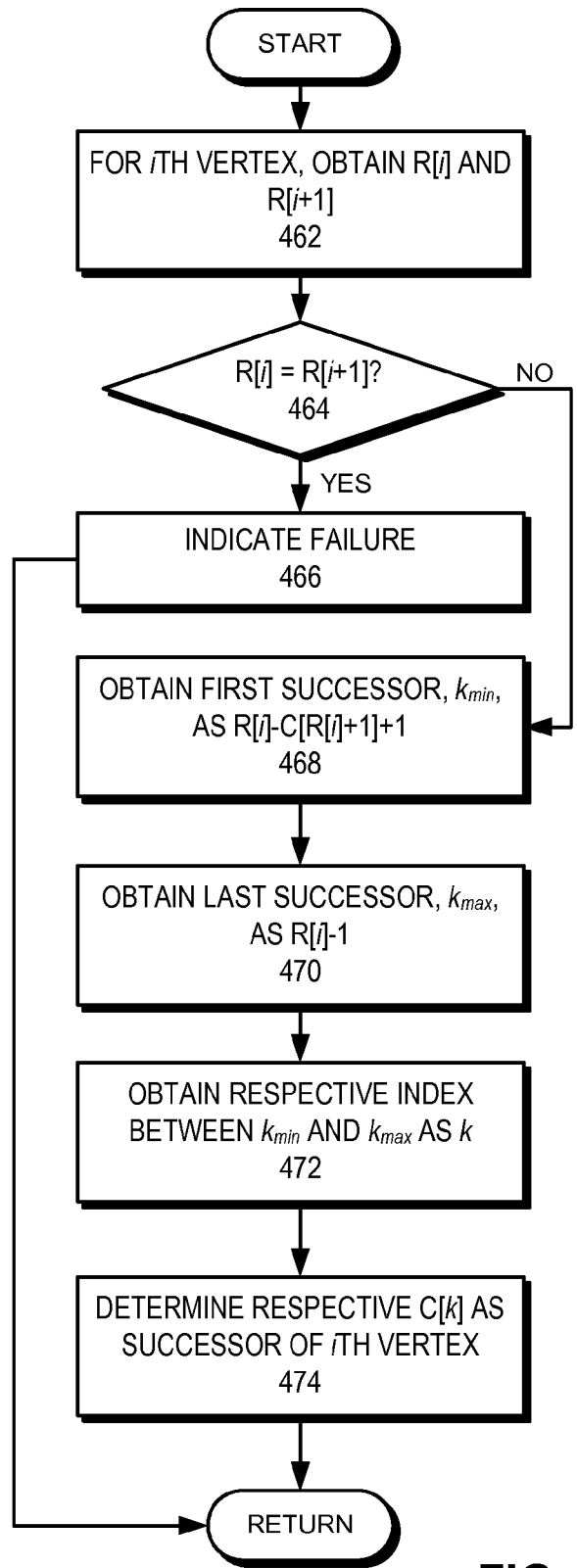
FIG. 4C presents a flowchart illustrating the process of enumerating all successors of a vertex from a basic ToC-last representation of a graph, in accordance with an embodiment of the present invention.

FIG. 4C presents a flowchart illustrating the process of enumerating all successors of a vertex from a basic ToC-last representation of a graph, in accordance with an embodiment of the present invention. This enumeration is edge-untyped. During operation, for the ith vertex (i.e., a vertex with identifier i), a data processing system obtains R[i] and R[i+1] (operation 462) and checks whether R[i] is equal to R[i+1] (operation 464). If R[i] is equal to R[i+1], the ith vertex does not have any successor. The system then indicates a failure (operation 466). In some embodiments, this indication can include a message stating that the ith vertex does not have any successor. If R[i] is not equal to R[i+1], the system obtains the first successor, $k_{min}$, as R[i]−C[R[i]+1]+1 (operation 468) and the last successor, $k_{max}$, as R[i]−1 (operation 470). The system then obtains a respective index between $k_{min}$ and $k_{max}$ as k (operation 472) and determines the respective C[k] as a successor of ith vertex (operation 474).

FIG. 4C is further elaborated in the pseudocode in Table 7.

TABLE 7

Pseudocode for enumerating all successors of a vertex from a basic ToC-last representation of a graph.

```
if (R[i] = R[i+1]) then return failure
k_min ← R[i]−C[R[i]+1]+1
k_max ← R[i]−1
for k = k_min to k_max
    successor ← C[k]
end for
```

Runtime Complexity of Basic ToC-Last Representation in MTCSR

For Edge-Typed Enumeration:

To enumerate the successors of an average vertex $v_i$ with b successors, of which b/T successors are reachable along a specific edge type t, accessing R[i] triggers one random read ($r_r \times 1$), accessing R[i+1] triggers one sequential read ($r_s \times 1$), and accessing C[R[i+1]+1] triggers one random read ($r_r \times 1$). Furthermore, using binary search to find a corresponding ToC entry triggers $\log_2 T$ random reads ($r_r \times \log_2 T$), obtaining the pointer field of the matching ToC entry triggers one sequential read ($r_s \times 1$), and obtaining the index of the last successor of edge type t in the C array triggers one sequential read ($r_s \times 1$). Moreover, following the pointer to obtain the first successor of edge type t in the C array triggers one random read ($r_r \times 1$), and accessing the remaining successors of edge type t triggers (b/T−1) sequential reads ($r_s \times (b/T-1)$).

Thus, the runtime for enumerating the successors of edge type t of an average vertex $v_i$ using ToC-last representation is:

$$r_r \times 1 + r_s \times 1 + r_r \times 1 + r_r \times \log_2 T + r_s \times 1 + r_s \times 1 + r_r \times 1 + r_s \times (b/T - 1) = r_r \times (3 + \log_2 T) + r_s \times (2 + b/T).$$

Hence, the total runtime for enumerating the successors for all n vertices and all T edge types in the graph is:

$$(r_r \times (3 + \log_2 T) + r_s \times (2 + b/T)) \times n \times T = r_r \times (3 + \log_2 T) \times n \times T + r_s \times (2n \times T + m).$$

For Edge-Untyped Enumeration:

To enumerate the successors of an average vertex $v_i$ with b successors regardless of the edge type, accessing R[i] triggers one random read ($r_r \times 1$), accessing R[i+1] triggers one sequential read ($r_s \times 1$), and accessing C[R[i]+1] triggers one random read ($r_r \times 1$). Furthermore, accessing the first successor in the C array triggers one random read ($r_r \times 1$), and accessing the remaining successors triggers (b−1) sequential reads ($r_s \times (b-1)$).

Thus, the runtime for enumerating the successors of an average vertex $v_i$ using ToC-last representation is:

$$r_r \times 1 + r_s \times 1 + r_r \times 1 + r_r \times 1 + r_s \times (b-1) = r_r \times 3 + r_s \times b.$$

Hence, the total runtime for enumerating the successors for all n vertices in the graph is:

$$(r_r \times 3 + r_s \times b) \times n = r_r \times 3n + r_s \times bn$$

$$= r_r \times 3n + r_s \times m.$$

Efficient ToC-Last Representation in MTCSR

FIG. 5A illustrates an exemplary representation of a graph with multiple edge types based on an efficient ToC-last representation in an MTCSR format, in accordance with an embodiment of the present invention. In this example, matrix 220 is represented in an efficient ToC-last representation based on R array 522 and C array 524. The pointer field of the ToC entry for a vertex and a corresponding edge type points to the last successor of the edge type of the vertex. Moreover, the pointer field appears before the edge type field in a respective entry of the ToC. The numbers in array elements representing the edge types are in boldface and denoted with dotted lines. The numbers in array elements representing the pointers are underlined and denoted with dashed lines. In this example, the value of a pointer is set to the relative position difference between the pointer and the pointee. In some embodiments, the end of the array is not explicitly stored in C array 524. In R array 522, R[0] is −1, which points to C[−1] comprising a "virtual dummy" ToC marking the start-of-ToC, whereas R[1] points to the ToC in C array 524 associated with the identifier 0 corresponding to successor vertex 202 instead of the identifier 1 corresponding to successor vertex 204.

For example, the end of ToC for the $2^{nd}$ vertex (i.e., vertex 206 with identifier 2) is pointed to by R[3], which is in C[13]. The first element C[13] in the ToC indicates a type 1 edge type. It is immediately preceded by a pointer in C[12], which indicates that the last type 1 successor of vertex 206 is 3 positions before. To get the position of this successor, the value of the pointer can be subtracted from the current position (which is 12). In this case, a pointer value of 3 means the last type 1 successor of vertex 206 is the $3^{rd}$ element before this pointer, as shown by curved arrow 514. The $3^{rd}$ element before C[12] is C[9], which includes the identifier 0 corresponding to successor vertex 202.

The preceding element in the ToC is C[11], which indicates a type 0 edge type. It is immediately preceded by a pointer in C[10], which indicates that the last type 0 successor of vertex 206 is 2 positions before. To get the position of this successor, the value of the pointer can be subtracted from the current position (which is 10). In this case, a pointer value of 2 means the last type 0 successor of vertex 206 is the $2^{nd}$ element before this pointer, as shown by curved arrow 512. The $2^{nd}$ element before C[10] is C[8], which includes the identifier 1 corresponding to successor vertex 204.

Unlike the basic ToC-last representation, no dummy ToC in the end of the C array is needed for the efficient ToC-last representation. The first successor of the first edge type is immediately preceded by the end of the previous ToC, and the first successor of the other edge types (i.e., which are not the first edge type) are immediately preceded by the last successor of the previous edge type. Thus, no explicit start-of-successors marker in the C array is needed. Similarly, except for the first vertex 202 with identifier 0, the start of a ToC is immediately preceded by the last successor of the last edge type. Thus, except for vertex 202, no explicit start-of-successors marker in the C array is needed. The first successor of the first edge type of vertex 202 is immediately preceded by a dummy ToC, as denoted by a "⊥" symbol. In some embodiments, the dummy ToC is not stored because only its address is needed but not its content. It should be noted that R[0] is −1 and points to C[−1], which includes the dummy ToC.

Figure 5B:
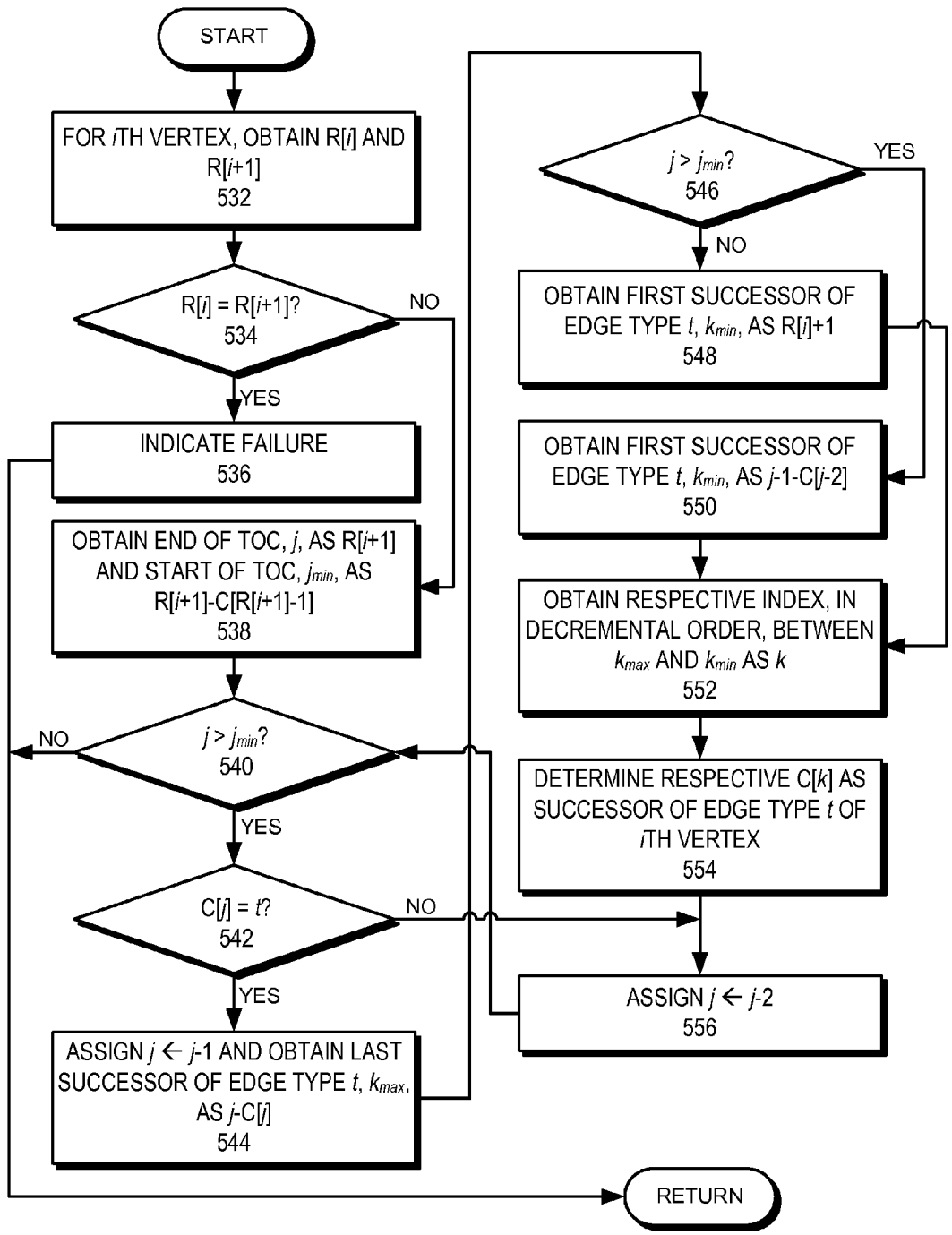
FIG. 5B presents a flowchart illustrating the process of enumerating a vertex's successors of an edge type from an efficient ToC-last representation of a graph with multiple edge types, in accordance with an embodiment of the present invention.

FIG. 5B presents a flowchart illustrating the process of enumerating a vertex's successors of an edge type from an efficient ToC-last representation of a graph with multiple edge types, in accordance with an embodiment of the present invention. This enumeration is edge-typed. During operation, for the ith vertex (i.e., a vertex with identifier i), a data processing system obtains R[i] and R[i+1] (operation 532) and checks whether R[i] is equal to R[i+1] (operation 534). If R[i] is equal to R[i+1], the ith vertex does not have any successor. The system then indicates a failure (operation 536). In some embodiments, this indication can include a message stating that the ith vertex does not have any successor. If R[i] is not equal to R[i+1], the system obtains the end of the ToC, j, as R[i+1] and the start of the ToC, $j_{min}$, as R[i+1]−C[R[i+1]−1] (operation 538).

The system checks, for a loop, whether j is greater than $j_{min}$ (operation 540). If not, the system has completed enumerating the successors of the ith vertex. Otherwise, the system checks whether C[j] is equal to t (operation 542). If C[j] is equal to t, the system assigns j←j−1 (i.e., decrements j) and obtains the last successor of edge type t, $k_{max}$, as j−C[j] (operation 544). The system then checks, for a condition, whether j is greater than $j_{min}$ (operation 546). If j is not greater than $j_{min}$ (e.g., is less than or equal to $j_{min}$), the system obtains the first successor of edge type t, $k_{min}$, as R[i]+1 (operation 548). Otherwise, the system obtains the first successor of edge type t, $k_{min}$, as j−1−C[j−2] (operation 550). After obtaining $k_{min}$ (operations 548 and 550), the system obtains a respective index, in decremental order, between $k_{max}$ and $k_{min}$ as k (operation 552) and determines the respective C[k] as a successor of edge type t of the ith vertex (operation 554). If C[j] is not equal to t (operation 542) or successors of edge type t have been determined (operation 554), the system assigns j←j−2 (operation 556) and continues to check, for the loop, whether j is greater than $j_{min}$ (operation 540).

FIG. 5B is further elaborated in the pseudocode in Table 8.

TABLE 8

Figure 5C:
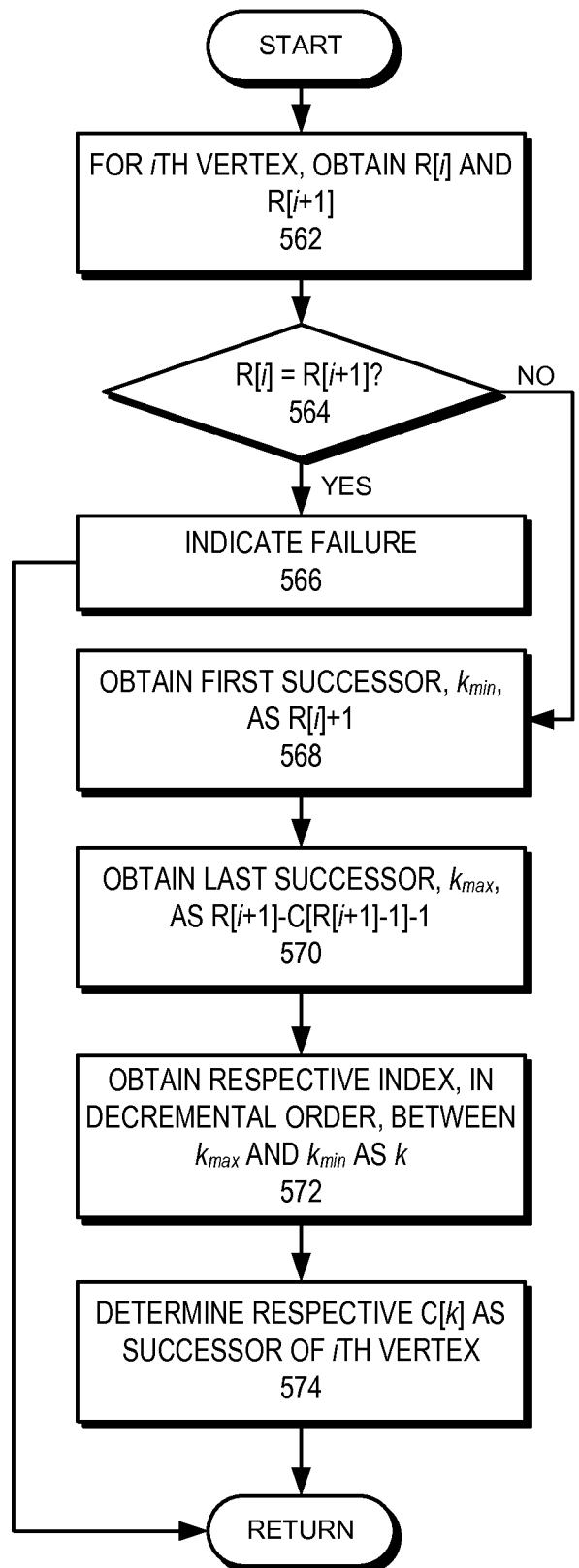
FIG. 5C presents a flowchart illustrating the process of enumerating all successors of a vertex from an efficient ToC-last representation of a graph, in accordance with an embodiment of the present invention.

Pseudocode for enumerating a vertex's successors of an edge type from an efficient ToC-last representation of a graph with multiple edge types.

if (R[i+1] = R[i]) then return failure
j ← R[i+1]
$j_{min}$ ← R[i+1]−C[R[i+1]−1]
while (j > $j_{min}$)
   if (C[j] = t) then
      j ← j−1
      $k_{max}$ ← j−C[j]
      if (j > $j_{min}$) then
         $k_{min}$ ← j−1−C[j−2]
      else
         $k_{min}$ ← R[i]+1
      end if
      for k = $k_{max}$ to $k_{min}$ step −1
         successor ← C[k]
      end for
      return success
   end if
   j ← j−2
end while
return failure FIG. 5C presents a flowchart illustrating the process of enumerating all successors of a vertex from an efficient ToC-last representation of a graph, in accordance with an embodiment of the present invention. This enumeration is edge-untyped. During operation, for the ith vertex (i.e., a vertex with identifier i), a data processing system obtains R[i] and R[i+1] (operation 562) and checks whether R[i] is equal to R[i+1] (operation 564). If R[i] is equal to R[i+1], the ith vertex does not have any successor. The system then indicates a failure (operation 566). In some embodiments, this indication can include a message stating that the ith vertex does not have any successor. If R[i] is not equal to R[i+1], the system obtains the first successor, $k_{min}$, as R[i]+1 (operation 568) and the last successor, $k_{max}$, as R[i+1]−C[R[i+1]−1]−1 (operation 570). The system then obtains a respective index, in decremental order, between $k_{max}$ and $k_{min}$ as k (operation 572) and determines the respective C[k] as a successor of the ith vertex (operation 574).

FIG. 5C is further elaborated in the pseudocode in Table 9.

TABLE 9

Pseudocode for enumerating all successors of a vertex from an efficient ToC-last representation of a graph.

if (R[i+1] = R[i]) then return failure
$k_{max}$ ← R[i+1]−C[R[i+1]−1]−1
$k_{min}$ ← R[i]+1
for k = $k_{max}$ to $k_{min}$ step −1
   successor ← C[k]
end for Runtime Complexity of Efficient ToC-Last Representation in MTCSR For Edge-Typed Enumeration:

To enumerate the successors of an average vertex $v_i$ with b successors, of which b/T successors are reachable along a specific edge type t, accessing R[i+1] triggers one random read ($r_r \times 1$), accessing R[i] triggers one sequential read ($r_s \times 1$), and accessing C[R[i+1]−1] triggers one random read ($r_r \times 1$). Furthermore, using binary search to find a corresponding ToC entry triggers $\log_2 T$ random reads ($r_r \times \log_2 T$), obtaining the pointer field of the matching ToC entry triggers one sequential read ($r_s \times 1$), and obtaining the index of the first successor of edge type t in the C array triggers one sequential read ($r_s \times 1$). Moreover, following the pointer to obtain the last successor of edge type t in the C array triggers one random read ($r_r \times 1$), and accessing the remaining successors of edge type t triggers (b/T−1) sequential reads ($r_s \times (b/T−1)$).

Thus, the runtime for enumerating the successors of edge type t of an average vertex $v_i$ using efficient ToC-last representation is:

$$r_r \times 1 + r_s \times 1 + r_r \times 1 + r_r \times \log_2 T + r_s \times 1 + r_s \times 1 + r_r \times 1 + r_s \times (b/T-1) = r_r \times (3 + \log_2 T) + r_s \times (2 + b/T).$$

Hence, the total runtime for enumerating the successors for all n vertices and all T edge types in the graph is:

$$(r_r \times (3+\log_2 T) + r_s \times (2+b/T)) \times n \times T = r_r \times (3+\log_2 T) \times n \times T + r_s \times (2n \times T + m).$$

For Edge-Untyped Enumeration:

To enumerate the successors of an average vertex $v_i$ with b successors regardless of the edge type, accessing R[i+1] triggers one random read ($r_r \times 1$), accessing R[i] triggers one sequential read ($r_s \times 1$), and accessing C[R[i+1]−1] triggers one random read ($r_r \times 1$). Furthermore, accessing the last successor in the C array triggers one random read ($r_r \times 1$) and accessing the remaining successors triggers (b−1) sequential reads ($r_s \times (b−1)$).

Thus, the runtime for enumerating the successors of an average vertex $v_i$ using efficient ToC-last representation is:

$$r_r \times 1 + r_s \times 1 + r_r \times 1 + r_r \times 1 + r_s \times (b-1) = r_r \times 3 + r_s \times b.$$

Hence, the total runtime of enumerating the successors for all n vertices in the graph is:

$$(r_r \times 3 + r_s \times b) \times n = r_r \times 3n + r_s \times bn$$
$$= r_r \times 3n + r_s \times m.$$

Both ToC-first and ToC-last representations have the same runtime complexity for edge-typed and edge-untyped graph traversals. However, since ToC-last representations do not assume the availability of ToC before the edges are presented, they are preferred over ToC-first representations. Between the two ToC-last representations, efficient ToC-last representation can be more cache-friendly and does not need to store a dummy ToC.

Space Complexity of Representations in MTCSR

The space requirements of ToC-first and ToC-last representations in MTCSR format are the same, as they both need to store (n+1) elements in the R array, $2n \times T$ elements for all the ToCs and m elements for all the edges in the C array. The basic ToC-last representation needs to store a dummy ToC in the end of the C array, leading to two extra elements in the C array. Thus, the worst-case space complexity is $O(n+1+2n \times T+m)$ for ToC-first and efficient ToC-last representations and $O(n+3+2n \times T+m)$ for the basic ToC-last representations. It should be noted that these space complexities are higher than $O(n+1+m)$ for the edge-type integrated row-based and $O(n \times T+1+m)$ for the edge-type integrated column-based representations.

ToCs allow operating using compact indices for only the types of edges a vertex has, and not for all the possible types of edges that a vertex could have. Thus, the best or average-case space complexity of representations in MTCSR format can be significantly better than the worst case that assumes every vertex must have at least one successor for each edge type. The best space complexity for representations in MTCSR format can be achieved when each vertex has only one type of successors. Hence, only 2n elements are needed to represent all ToCs, yielding the best-case space complexity of $O(3n+1+m)$ for ToC-first and ToC-last representations. In comparison, the best-case space complexity for the edge-type integrated column-based representation is still $O(n \times T+1+m)$, which is worse than the best-case complexity of MTCSR for T>3.

Let $T_i$ be the number of edge types vertex $v_i$ actually has, wherein $T_i = |\{b_{it}|b_{it}>0\}|$, where $b_{it}$ is the number of successors of edge type t of $v_i$. Let $\overline{T}$ be the average number of edge types, defined as:

$$\overline{T} = \frac{1}{n}\sum_{i=0}^{n-1} T_i.$$

The average space complexity of MTCSR (for both ToC-first and ToC-last representations) is $O(n+1+2n\overline{T}+m)$. Compared to the edge-type integrated column-based representation's average space complexity of $O(n \times T+1+m)$, MTCSR saves space for $T>2\overline{T}+1$. If on average each vertex needs less than 50% of all the edge types to encode all of its successors, then representations in MTCSR format are more space-efficient than the edge-type integrated column-based representation. This is typical in a graph representing multiple relationships among a heterogeneous set of vertices. For example, a graph with vertices representing both consumers and products can allow an "is-a-friend-of" edge type to exist between consumer vertices but not between product vertices, whereas a "from-same-vendor" edge type is only allowed between product vertices but not between consumer vertices.

As another example, suppose that a graph represents people's relationships, such as "is-a-social-media-friend-of," "is-married-to," "is-father-of," and "is-mother-of." Here, not all relationships are appropriate for all individuals. For example, the "is-a-social-media-friend-of" relationship may not be applicable to someone who does not have a social media account. In general, if not all edge types are applicable to all vertices, or if some vertices do not have any successor of an edge type, it can be shown that $T>\overline{T}$, which can lead to $T>2\overline{T}+1$. Under this condition, representations in MTCSR format surpass the edge-type integrated column-based representation in space efficiency.

ToC Compression

ToCs can be compressed to achieve space efficiency. For example, if the graph has fewer than $2^{16}$ edge types, a short (e.g., 16-bit) instead of a long (e.g., 32-bit) unsigned integer can be used to encode the edge type field of a ToC. Suppose that the set of first-ToC successors and last-ToC successors of a vertex are those successors that are pointed to by the first ToC entry and the last ToC entry of a vertex, respectively. The concept of first-ToC successors is useful for ToC-last representation because the number of bits required to represent the pointer field using ToC-last representation is independent of the number of first-ToC successors. Similarly, the concept of last-ToC successors is useful for ToC-first representation because the number of bits required to represent the pointer field using ToC-first representation is independent of the number of last-ToC successors. Thus, to improve the effectiveness of the ToC compression technique, it is better to have more first-ToC successors for ToC-last encoding or more last-ToC successors for ToC-first encoding.

Figure 6A:
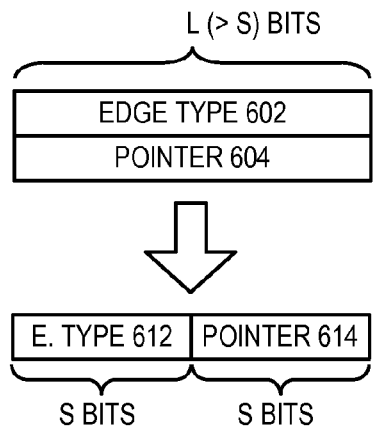
FIG. 6A illustrates an exemplary ToC compression for a graph with multiple edge types, in accordance with an embodiment of the present invention.

FIG. 6A illustrates an exemplary ToC compression for a graph with multiple edge types, in accordance with an embodiment of the present invention. Suppose that an edge type field 602 and pointer field 604 of a ToC entry of a graph are L bits long. If the graph has fewer than $2^S$ edge types, wherein S<L, a short (e.g., S-bit) instead of a long (e.g., L-bit) unsigned integer can be used to encode the edge type field 612 of the ToC. Similarly, if a respective vertex of the graph has fewer than $2^S$ successors, a short (e.g., S-bit) instead of a long (e.g., L-bit) unsigned integer can be used to encode the pointer field 614 of the ToC.

More generally, suppose that S and L (S<L) are the number of bits used to encode a short-range pointer and a long-range pointer, respectively. If a short-range pointer is deemed infeasible, ToC compression uses a special invalid-short-range-pointer value∈{0, $2^S-1$} to indicate that the actual pointer is stored in the L-bit word that immediately follows this value. Between 0 and $2^S-1$, 0 is preferred because such a value does not reduce the useful encoding space of short-range pointers. Typically, S is set to 50% of L (e.g., S=L/2). If a long-range pointer becomes infeasible (e.g., due to a vertex having more than $2^L$ successors), the ToC compression allows more than two types of pointers. For example, a long-long-range pointer type, which takes 2L bits or more to encode, can follow a long-range pointer of L bit with a special invalid-long-range-pointer value chosen between {0, $2^L-1$}.

Figure 6B:
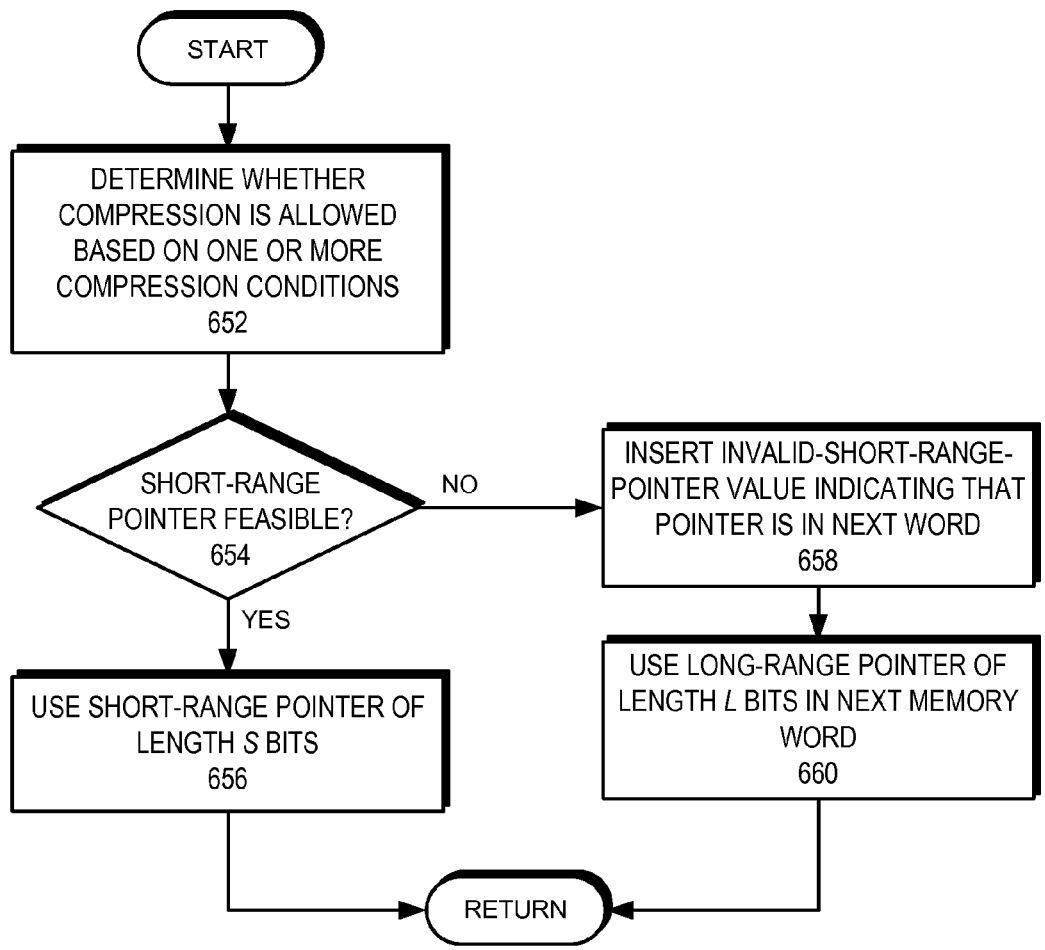
FIG. 6B presents a flowchart illustrating the process of determining successor pointer length of a ToC for a graph with multiple edge types, in accordance with an embodiment of the present invention.

FIG. 6B presents a flowchart illustrating the process of determining a successor pointer length of a ToC for a graph with multiple edge types, in accordance with an embodiment of the present invention. During operation, a graph translation application determines whether compression is allowed based on one or more compression conditions (operation 652). Examples of compression conditions include, but are not limited to, fewer than $2^S$ non last-ToC successors and ToC entries combined in ToC-first representation, fewer than $2^S$ non first-ToC successors and ToC entries combined in ToC-last representation, and fewer than $2^S$ successors in basic ToC-last representation. The application then checks whether a short-range pointer is feasible for a ToC (operation 654). If so, the application uses a short-range pointer of length S bits (operation 656). Otherwise, the application inserts an invalid-short-range pointer indicating that the actual pointer is in the next word (operation 658) and uses a long-range pointer of length L bits in the next memory word (operation 660), as described in conjunction with FIG. 6A.

Implicitly Typed ToC-First Representation in MTCSR

In some embodiments, edge types can be implicitly incorporated in ToCs. The edge type field in a ToC entry can be removed and only the pointer field of the ToC entry is stored. The edge type can be encoded implicitly with the position of the pointer field in the ToC entry. A respective vertex has a fixed number of T pointers such that the tth pointer points to the first or last successor of the vertex for the ToC-first or the efficient ToC-last representation, respectively. ToCs with implicit edge types can be referred to as implicitly typed ToCs. In some embodiments, if a vertex does not have a successor of type t, the corresponding pointer field points to: (i) for the ToC-first or basic ToC-last representation, the first successor of the next edge type or the ToC of the next vertex, and (ii) for the efficient ToC-last representation, the last successor of the previous edge type or the ToC of the previous vertex.

FIG. 7A illustrates an exemplary representation of a graph with multiple edge types based on an implicitly typed ToC-first representation in an MTCSR format, in accordance with an embodiment of the present invention. In this example, matrix 220 is represented in an implicitly typed ToC-first representation based on R array 722 and C array 724. The pointer field of the ToC entry for a vertex and edge type pair points to the first successor of the edge type of the vertex. The numbers in array elements representing the pointers are underlined and denoted with dashed lines. In this example, the value of a pointer is set to the relative position difference between the pointer and the pointee. In some embodiments, the end of the array, as denoted by a "⊥" symbol, is not explicitly stored in C array 724.

For example, the ToC for the $2^{nd}$ vertex (i.e., vertex 206 with identifier 2) is pointed to by R[2], which is in C[8]. The first element C[8] in the ToC includes a pointer, which indicates that the first type 0 successor of vertex 206 is 2 positions away. To get the position of this successor, the value of the pointer can be added to the current position (which is 8). It is immediately followed by a pointer in C[9], which indicates that the first type 1 successor of vertex 206 is 2 positions away. The $2^{nd}$ element after C[8] is C[10], which includes the identifier 1 corresponding to the successor vertex 204. Similarly, the $2^{nd}$ element after C[9] is C[11], which includes the identifier 0 corresponding to the successor vertex 202.

On the other hand, the ToC for the $1^{st}$ vertex (i.e., vertex 204 with identifier 1) is pointed by R[1], which is in C[4]. The first element C[4] in the ToC includes a pointer, which indicates that the first type 0 successor of vertex 204 is 2 positions away. To get the position of this successor, the value of the pointer can be added to the current position (which is 4). It is immediately followed by a pointer in C[5], which indicates that the first type 1 successor of vertex 204 is 3 positions away. The $2^{nd}$ element after C[4] is C[6], which includes the identifier 0 corresponding to the successor vertex 202. However, the $3^{rd}$ element after C[5] is C[8], which is the ToC of the next vertex 206, as shown by curved arrow 712. This indicates that vertex 204 does not have a type 1 successor.

Figure 7B:
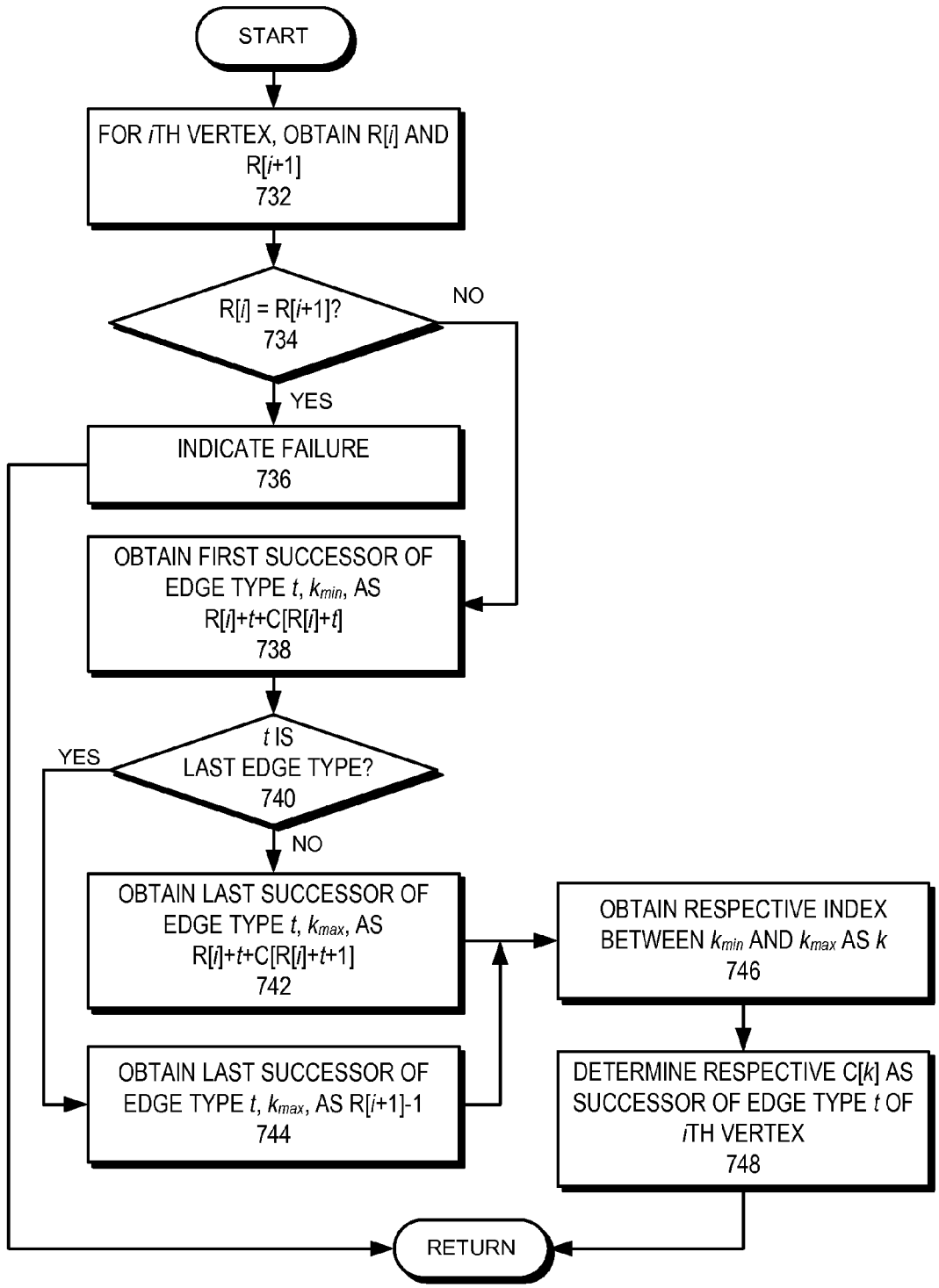
FIG. 7B presents a flowchart illustrating the process of enumerating a vertex's successors of an edge type from an implicitly typed ToC-first representation of a graph with multiple edge types, in accordance with an embodiment of the present invention.

FIG. 7B presents a flowchart illustrating the process of enumerating a vertex's successors of an edge type from an implicitly typed ToC-first representation of a graph with multiple edge types, in accordance with an embodiment of the present invention. This enumeration is edge-typed. During operation, for the ith vertex (i.e., a vertex with identifier i), a data processing system obtains R[i] and R[i+1] (operation 732) and checks whether R[i] is equal to R[i+1] (operation 734). If R[i] is equal to R[i+1], the ith vertex does not have any successor. The system then indicates a failure (operation 736). In some embodiments, this indication can include a message stating that the ith vertex does not have any successor.

If R[i] is not equal to R[i+1], the system obtains the first successor of edge type t, $k_{min}$, as R[i]+t+C[R[i]+t] (operation 738). The system then checks whether t is the last edge type (operation 740). If t is not the last edge type, the system obtains the last successor of edge type t, $k_{max}$, as R[i]+t+C[R[i]+t+1] (operation 742). Otherwise, the system obtains the last successor of edge type t, $k_{max}$, as R[i+1]−1 (operation 744). After obtaining $k_{max}$ (operation 742 or 744), the system obtains a respective index between $k_{min}$ and $k_{max}$ as k (operation 746) and determines the respective C[k] as a successor of edge type t of the ith vertex (operation 748).

FIG. 7B is further elaborated in the pseudocode in Table 10.

TABLE 10

Figure 7C:
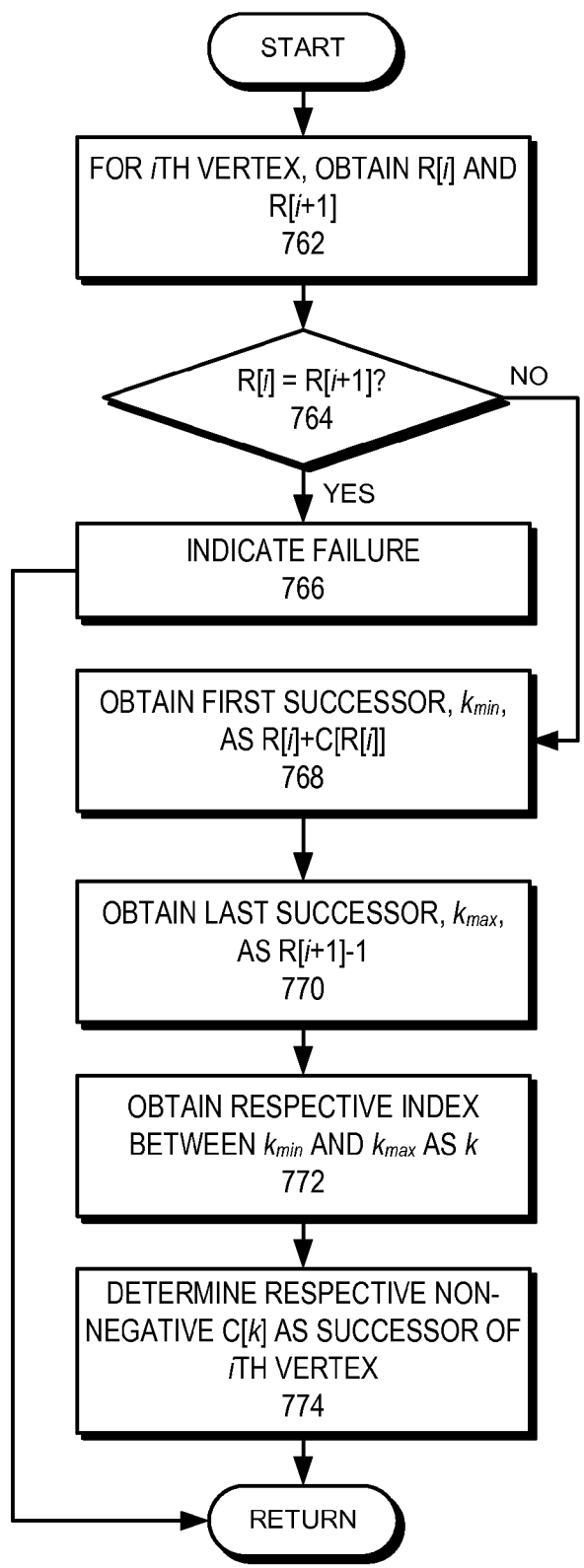
FIG. 7C presents a flowchart illustrating the process of enumerating all successors of a vertex from an implicitly typed ToC-first representation of a graph, in accordance with an embodiment of the present invention.

Pseudocode for enumerating a vertex's successors of an edge type from an implicitly typed ToC-first representation of a graph with multiple edge types.

if (R[i] = R[i+1]) then return failure
$k_{min}$ ← R[i]+t+C[R[i]+t]
if (t ≠ T−1) then
    $k_{max}$ ← R[i]+t+C[R[i]+t+1]
else
    $k_{max}$ ← R[i+1]−1
end if
if ($k_{min}$ > $k_{max}$) then return failure
for k = $k_{min}$ to $k_{max}$
    successor ← C[k]
end for
return success FIG. 7C presents a flowchart illustrating the process of enumerating all successors of a vertex from an implicitly typed ToC-first representation of a graph, in accordance with an embodiment of the present invention. This enumeration is edge-untyped. During operation, for the ith vertex (i.e., a vertex with identifier i), a data processing system obtains R[i] and R[i+1] (operation 762) and checks whether R[i] is equal to R[i+1] (operation 764). If R[i] is equal to R[i+1], the ith vertex does not have any successor. The system then indicates a failure (operation 766). In some embodiments, this indication can include a message stating that the ith vertex does not have any successor. If R[i] is not equal to R[i+1], the system obtains the first successor, $k_{min}$, as R[i]+C[R[i]] (operation 768) and the last successor, $k_{max}$, as R[i+1]−1 (operation 770). The system then obtains a respective index between $k_{min}$ and $k_{max}$ as k (operation 772) and determines the respective non-negative C[k] (i.e., wherein C[k]≥0) as a successor of the ith vertex (operation 774).

FIG. 7C is further elaborated in the pseudocode in Table 11.

TABLE 11

Pseudocode for enumerating all successors of a vertex from an implicitly typed ToC-first representation of a graph.

if (R[i] = R[i+1]) then return failure
$k_{min}$ ← R[i]+C[R[i]]
$k_{max}$ ← R[i+1]−1
for k = $k_{min}$ to $k_{max}$
    if (C[k] ≥ 0) then
        successor ← C[k]
    end if
end for Implicitly Typed ToC-Last Representation in MTCSR FIG. 8A illustrates an exemplary representation of a graph with multiple edge types based on an implicitly typed efficient ToC-last representation in an MTCSR format, in accordance with an embodiment of the present invention. In this example, matrix 220 is represented in an implicitly typed efficient ToC-last representation based on R array 822 and C array 824. The pointer field of the ToC entry for a vertex and the corresponding edge type points to the last successor of the edge type of the vertex. The numbers in array elements representing the pointers are underlined and denoted with dashed lines. In this example, the value of a pointer is set to be the relative position difference between the pointer and the pointee. In some embodiments, the end of array, as denoted by a "⊥" symbol, is not explicitly stored in C array 824. In R array 822, R[0] is −1 and points to C[−1], as denoted by the "1" symbol. C[−1] includes a "virtual dummy" ToC marking the start-of-ToC, whereas R[1] points to the ToC in C array 824 associated with the identifier 0 corresponding to successor vertex 202 instead of the identifier 1 corresponding to successor vertex 204.

For example, the ToC for the $2^{nd}$ vertex (i.e., vertex 206 with identifier 2) is pointed to by R[3], which is in C[11]. The first element C[11] in the ToC includes a pointer, which indicates that the last type 1 successor of vertex 206 is 2 positions before. To get the position of this successor, the value of the pointer can be subtracted from the current position (which is 11). It is immediately preceded by a pointer in C[10], which indicates that the last type 0 successor of vertex 206 is 2 positions before. The $2^{nd}$ element before C[11] is C[9], which includes the identifier 0 corresponding to the successor vertex 202. Similarly, the $2^{nd}$ element before C[10] is C[8], which includes the identifier 1 corresponding to the successor vertex 204.

On the other hand, the ToC for the $1^{st}$ vertex (i.e., vertex 204 with identifier 1) is pointed to by R[2], which is in C[7]. The first element C[7] in the ToC includes a pointer, which indicates that the last type 1 successor of vertex 204 is 2 positions before. To get the position of this successor, the value of the pointer can be subtracted from the current position (which is 7). It is immediately preceded by a pointer in C[6], which indicates that the last type 0 successor of vertex 204 is 1 position before. The $1^{st}$ element before C[6] is C[5], which includes the identifier 2 corresponding to the successor vertex 206, which is the last successor of type 0. However, the $2^{nd}$ element before C[7] is also C[5], which is the last successor of the previous edge type, as shown by curved arrow 812. This indicates that vertex 204 does not have a type 1 successor.

Figure 8B:
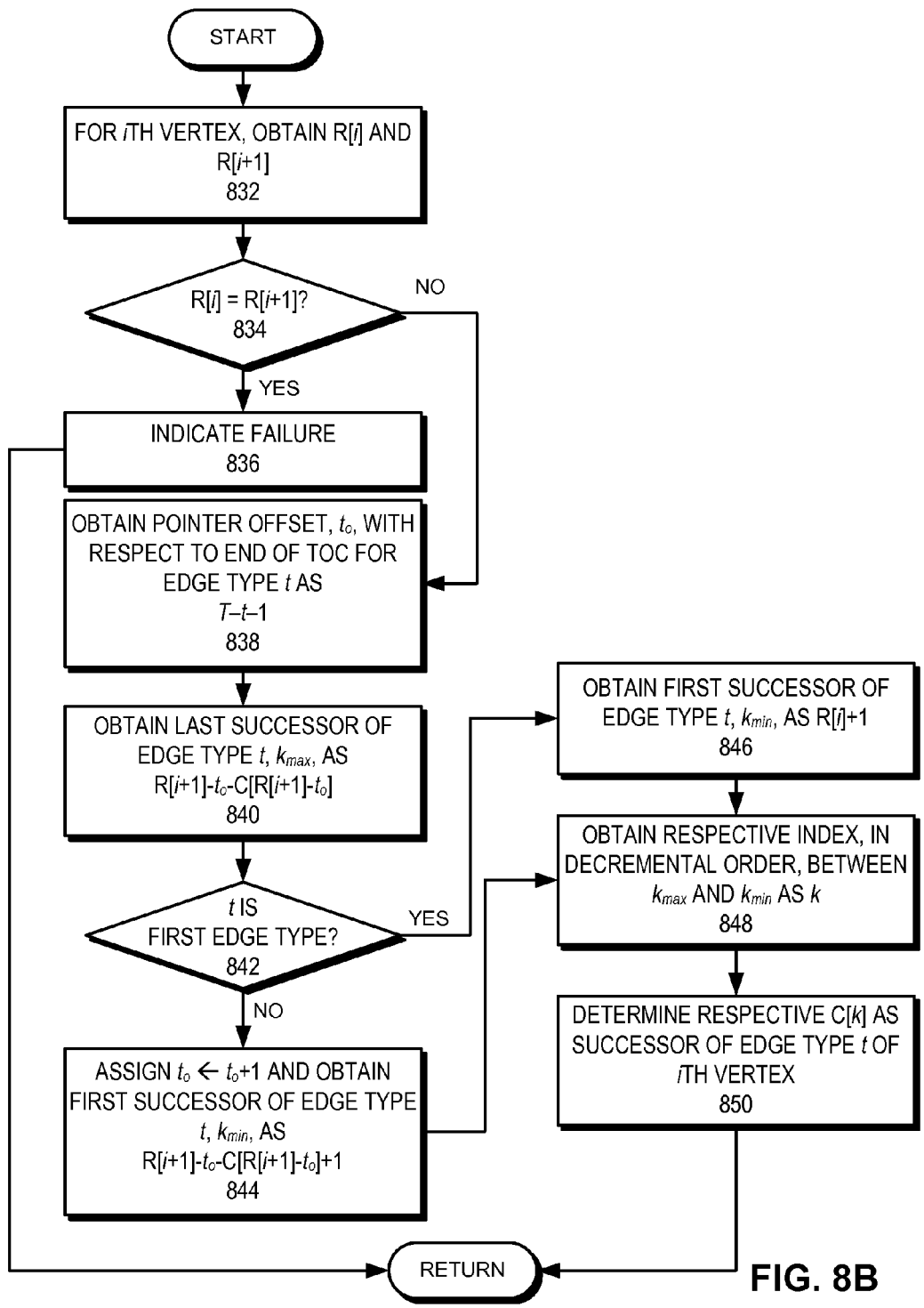
FIG. 8B presents a flowchart illustrating the process of enumerating a vertex's successors of an edge type from an implicitly typed ToC-last representation of a graph with multiple edge types, in accordance with an embodiment of the present invention.

FIG. 8B presents a flowchart illustrating the process of enumerating a vertex's successors of an edge type from an implicitly typed efficient ToC-last representation of a graph with multiple edge types, in accordance with an embodiment of the present invention. This enumeration is edge-typed. During operation, for the ith vertex (i.e., a vertex with identifier i), a data processing system obtains R[i] and R[i+1] (operation 832) and checks whether R[i] is equal to R[i+1] (operation 834). If R[i] is equal to R[i+1], the ith vertex does not have any successor. The system then indicates a failure (operation 836). In some embodiments, this indication can include a message stating that the ith vertex does not have any successor. If R[i] is not equal to R[i+1], the system obtains a pointer offset, $t_o$, with respect to the end of ToC for edge type t as T−t−1 (operation 838).

The system obtains the last successor of edge type t, $k_{max}$, as R[i+1]−$t_o$−C[R[i+1]−$t_o$] (operation 840). The system then checks whether or not t is the first edge type (operation 842). If t is not the first edge type, the system assigns $t_o$ ← $t_o$+1 (i.e., increments $t_o$) and obtains the first successor of edge type t, $k_{min}$, as R[i+1]−$t_o$−C[R[i+1]−$t_o$]+1 (operation 844). Otherwise, the system obtains the first successor of edge type t, $k_{min}$, as R[i]+1 (operation 846). After obtaining $k_{min}$ (operations 744 and 746), the system obtains, in decremental order, a respective index between $k_{max}$ and $k_{min}$ as k (operation 848) and determines the respective C[k] as a successor of edge type t of the ith vertex (operation 850).

FIG. 8B is further elaborated in the pseudocode in Table 12.

TABLE 12

Figure 8C:
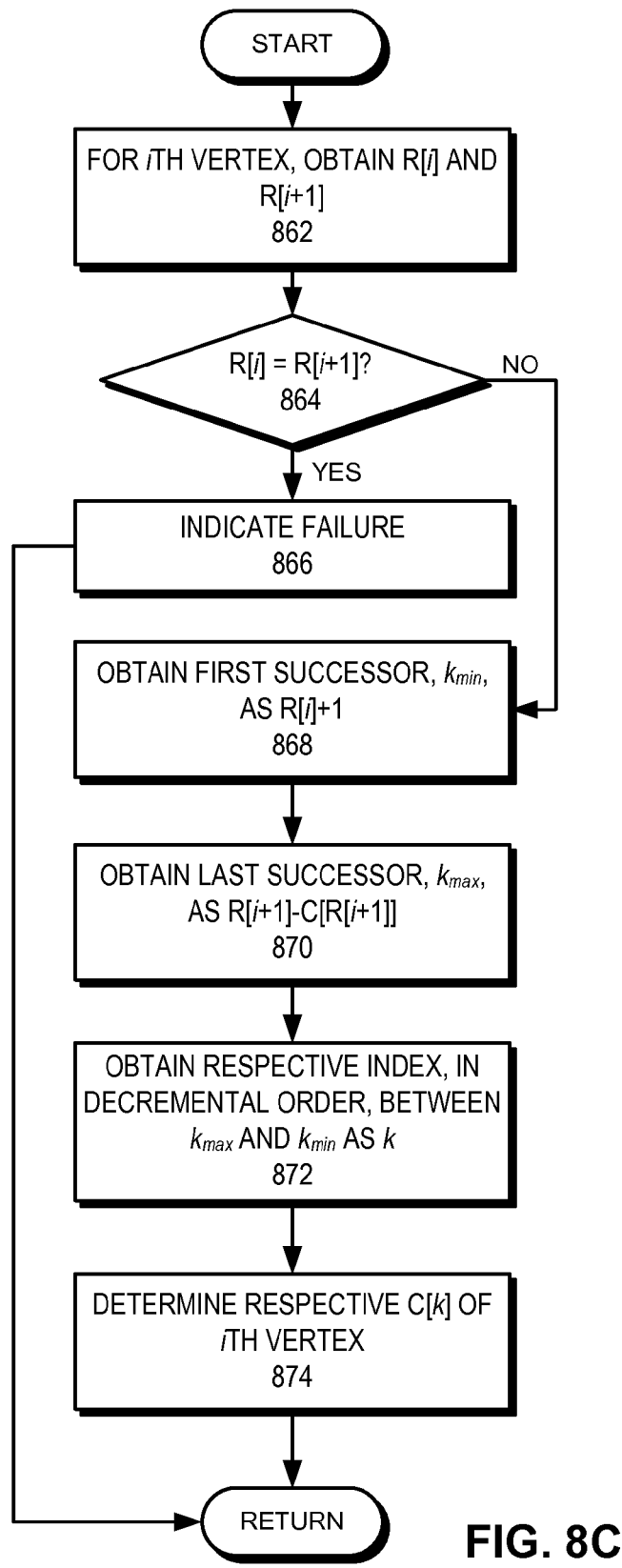
FIG. 8C presents a flowchart illustrating the process of enumerating all successors of a vertex from an implicitly typed ToC-last representation of a graph, in accordance with an embodiment of the present invention.

Pseudocode for enumerating a vertex's successors of an edge type from an implicitly typed efficient ToC-last representation of a graph with multiple edge types.

if (R[i+1] = R[i]) then return failure
$t_o \leftarrow T-t-1$
$k_{max} \leftarrow R[i+1]-t_o-C[R[i+1]-t_o]$
if (t > 0) then
    $t_o \leftarrow t_o+1$
    $k_{min} \leftarrow R[i+1]-t_o-C[R[i+1]-t_o]+1$
else
    $k_{min} \leftarrow R[i]+1$
end if
if ($k_{max} < k_{min}$) then return failure
for k = $k_{max}$ to $k_{min}$ step -1
    successor ← C[k]
end for
return success FIG. 8C presents a flowchart illustrating the process of enumerating all successors of a vertex from an implicitly typed efficient ToC-last representation of a graph, in accordance with an embodiment of the present invention. This enumeration is edge-untyped. During operation, for the ith vertex (i.e., a vertex with identifier i), a data processing system obtains R[i] and R[i+1] (operation 862) and checks whether R[i] is equal to R[i+1] (operation 864). If R[i] is equal to R[i+1], the ith vertex does not have any successor. The system then indicates a failure (operation 866). In some embodiments, this indication can include a message stating that the ith vertex does not have any successor. If R[i] is not equal to R[i+1], the system obtains the first successor, $k_{min}$, as R[i]+1 (operation 868) and the last successor, $k_{max}$, as R[i+1]−C[R[i+1]] (operation 870). The system then obtains, in decremental order, a respective index between $k_{max}$ and $k_{min}$ as k (operation 872) and determines the respective C[k] as a successor of the ith vertex (operation 874).

FIG. 8C is further elaborated in the pseudocode in Table 13.

TABLE 13

Pseudocode for enumerating all successors of a vertex from an implicitly typed efficient ToC-last representation of a graph.

if (R[i+1] = R[i]) then return failure
$k_{max} \leftarrow R[i+1]-C[R[i+1]]$
$k_{min} \leftarrow R[i]+1$
for k = $k_{max}$ to $k_{min}$ step-1
    successor ← C[k]
end for Comparisons Among Representations Selecting a suitable representation is often multi-objective in nature, involving factors such as speed, space, and (likelihood of) the type of graph traversals. Table 14 highlights a few useful heuristics that could assist in quickly finding the appropriate representation.

TABLE 14

Candidate representations based on the branching factor (b) and the number of edge types (T).

| Candidate Representation | Branching factor b | Total edge types T |
|---|---|---|
| Edge-type integrated row-based | Small | Large |
| Edge-type integrated column-based | Large | Small |
| MTCSR | Medium~Large | Any, if T > 2$\overline{T}$ + 1 |

If MTCSR is selected, further selection of one of the variants of MTCSR is needed. For example, both ToC-first and basic ToC-last representations have the same space and runtime complexity, whereas basic ToC-last representation does not require ToC information up front. However, if it is important to enumerate successors in the same order as they are stored in memory from low to high addresses, ToC-first MTCSR may be preferred, since ToC-last encoding could reverse the order. Furthermore, if ToC compression is used, depending on whether there are more last-ToC or first-ToC successors, one of ToC-first or ToC-last representations can be preferred.

To decide whether implicitly typed representations in MTCSR format are better than their typed counterparts, their respective average-case space complexities can be compared. For example, ToC-first representation's average space complexity is O(n+1+2n$\overline{T}$+m). On the other hand, the average space complexity of implicitly typed ToC-first representation is O(n+1+n×T+m). Thus, using implicitly typed representations is more space-efficient when T<2$\overline{T}$. Otherwise, the explicitly typed representations in MTCSR format save more memory.

The worst-case runtime complexities of implicitly typed representations in MTCSR formats are shown in Table 15. In particular, implicitly typed representations in MTCSR formats are faster than their explicitly typed counterparts, on edge-typed traversals. On edge-untyped traversals, both implicitly and explicitly typed representations in MTCSR formats are equally fast.

TABLE 15

Worst-case runtime complexity of implicitly typed representations in MTCSR format

| | Implicitly typed ToC-first and ToC-last representations |
|---|---|
| Typed | $r_r \times 3n \times T + r_s \times (n \times T + m)$ |
| Untyped | $r_r \times 3n + r_s \times m$ |

Table 16 shows the main characteristics of six MTCSR variant representations under the following four categories:
1. Preferred ToC info: whether or not the MTCSR variant prefers to know ToC information up front before the edges are presented.
2. Preferred enumeration order: whether or not the preferred order of successor enumeration is the same as the order in which the successors are stored in the input file.
3. Better space efficiency: condition under which a class of MTCSR variants is more space-efficient than the other class, wherein the two classes are explicitly-typed and implicitly-typed.
4. Better ToC compression: feature that could lead to better ToC compression. The "↑" symbol indicates a positive correlation between the number of a certain type of (either first-ToC or last-ToC) successors and the likelihood of encoding the pointer field of ToC entries as short-range pointers, assuming the total number of edges in the graph is fixed.

TABLE 16

Characteristics of MTCSR variants.

| MTCSR variants | Preferred ToC information | Preferred enumeration order | Better space efficiency | Better ToC compression |
|---|---|---|---|---|
| Explicit ToC-first | Up front | Same | $T > 2\overline{T}$ | Last-ToC succs.↑ |
| Explicit efficient ToC-last | Flexible | Reversed | | First-ToC succs.↑ |
| Explicit basic ToC-last | Flexible | Same | | Neither of above |
| Implicit ToC-first | Flexible | Same | $T < 2\overline{T}$ | Not applicable |
| Implicit efficient ToC-last | Flexible | Reversed | | Not applicable |
| Implicit basic ToC-last | Flexible | Same | | Not applicable |

Exemplary System

Figure 9:
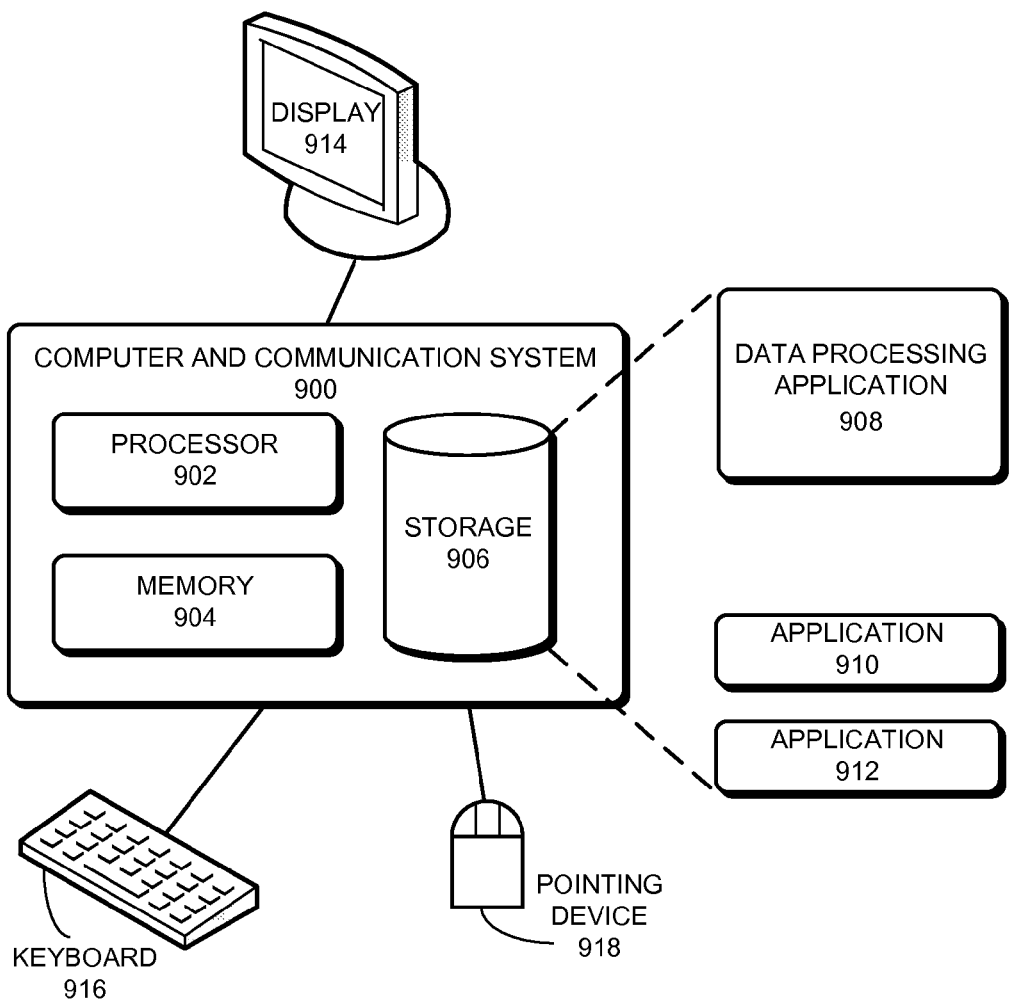
FIG. 9 illustrates an exemplary data processing system, in accordance with an embodiment of the present invention.

FIG. 9 illustrates an exemplary data processing system, in accordance with an embodiment of the present invention. In one embodiment, a computer and communication system 900 operates as a data processing system. Computer and communication system 900 includes a processor 902, a memory 904, and a storage device 906. Storage device 906 stores a data processing application 908, as well as other applications, such as applications 910 and 912. During operation, information from data processing application 908 is loaded from storage device 906 into memory 904 and then executed by processor 902.

While executing the program, processor 902 performs the aforementioned functions. Computer and communication system 900 is coupled to an optional display 914, keyboard 916, and pointing device 918. In some embodiments, data processing application 908 can be executed on a plurality of computer and communication systems, which are able to exchange data that describes the state of the operation associated with data processing application 908.

Note that the above-mentioned modules can be implemented in hardware as well as in software. In one embodiment, these modules can be embodied in computer-executable instructions stored in a memory which is coupled to one or more processors in computer and communication system 900. When executed, these instructions cause the processor(s) to perform the aforementioned functions.

In summary, embodiments of the present invention provide a computer system and a method for efficient representation of graphs with multiple edge types. In one embodiment, the computing system includes a processor and a computer-readable storage medium. The computer-readable storage medium stores instructions which when executed by the processor cause the processor to perform a method. The method comprises obtaining from a first data structure one or more pointers to corresponding elements in a second data structure. A respective vertex of a graph corresponds to an element in the first data structure, and the graph supports multiple edge types between respective vertex pairs. The method further comprises obtaining from the second data structure a respective edge type associated with a respective vertex and a respective successor vertex of the edge type and enumerating a respective successor vertex of an edge type of a vertex from the second data structure based on a pointer in an element in the first data structure associated with the vertex.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer-executable method for facilitating management of a memory of a computing device, comprising:
    representing a first vertex of a graph as an element in a first data structure managed in the memory of the computing device,
    wherein the first data structure includes one or more pointers to corresponding elements in a second data structure which is a Table of Content (ToC) structure, wherein the graph supports multiple edge types between respective vertex pairs;
    representing a successor vertex and an edge type of the first vertex in the second data structure managed in the memory of the computing device;
    storing the first and the second data structure in the memory of the computing device, which causes the computing device to manage the memory;
    obtaining, from the first data structure based on the first vertex, the one or more pointers to the corresponding elements in the second data structure,
    wherein obtaining the one or more pointers causes the computing device to manage the memory by performing an efficient lookup in the ToC based on available computational resources; and
    managing the memory of the computing device further by determining, for the first vertex based on the corresponding elements in the second data structure, a respective edge type associated with the first vertex and a respective successor vertex of the respective edge type, and
    wherein a processor of the computing device discovers information of interest across multiple types and strength of relationships between elements in the first data structure and elements in the second data structure.

2. The method of claim 1, wherein the second data structure includes vertex identifiers of successor vertices, and wherein the edge types of the successor vertices are represented along with the vertex identifiers; and wherein the successor vertex is enumerated based on a floor operation and a modulo operation.

3. The method of claim 1, wherein successor vertices of same edge types of a vertex are represented in a column, and wherein columns representing all edges from the vertex are stored consecutively in the second data structure; and wherein enumerating the successor vertex further comprises identifying start and end indices of successor vertices in the first data structure based on elements in the second data structure.

4. The method of claim 1, wherein an element of the first data structure points to the Table of Content (ToC) structure, which includes one or more ToC entries, wherein a ToC entry includes an edge type field and a pointer field pointing to a successor vertex of an edge type stored in the second data structure.

5. The method of claim 4, wherein the edge type field and the pointer field are stored in consecutive order in the second data structure; and wherein enumerating the successor vertex further comprises:
identifying the ToC in the second data structure based on a pointer in an element in the first data structure, wherein the pointer field of the ToC points to the first successor of the edge type of the vertex; and
identifying respective successors from a first to a last successor of the edge type indicated by the edge type field.

6. The method of claim 4, wherein the edge type field and the pointer field are stored in consecutive order in the second data structure; and wherein enumerating the successor vertex further comprises:
identifying the ToC in the second data structure based on a pointer in an element in the first data structure, wherein the pointer field of the ToC points to the first successor of the edge type of the vertex before the pointer field; and
identifying respective successors from a first to a last successor of the edge type indicated by the edge type field.

7. The method of claim 4, wherein the pointer field and the edge type field are stored in consecutive order in the second data structure; and wherein enumerating the successor vertex further comprises:
identifying the ToC in the second data structure based on a pointer in an element in the first data structure, wherein the pointer field of the ToC points to the last successor of the edge type of the vertex before the pointer field; and
identifying respective successors in decremental order from a last to a first successor of the edge type indicated by the edge type field.

8. The method of claim 4, further comprising compressing one or more of the edge type field and the pointer field to a short-range value.

9. The method of claim 4, wherein the ToC does not include the edge type field, and wherein the edge type is implicitly encoded based on the location of the pointer field in the second data structure.

10. The method of claim 4, wherein source and destination vertices of a respective edge is reversed; and wherein successor vertices of same edge types of a vertex are represented in a column, and wherein columns representing all edges from the vertex are stored consecutively in the second data structure.

11. The method of claim 4, further comprising determining what the pointer field of the ToC points to based on one or more of:
preferred ToC information;
preferred enumeration order;
space efficiency; and
ToC compression.

12. The method of claim 1, wherein the successor vertex is enumerated without considering edge types.

13. A non-transitory computer-readable storage medium storing instructions that when executed by a computer cause the computer to perform a method, the method comprising:
representing a first vertex of a graph as an element in a first data structure managed in the memory of the computer,
wherein the first data structure includes one or more pointers to corresponding elements in a second data structure which is a Table of Content (ToC) structure, wherein the graph supports multiple edge types between respective vertex pairs;
representing a successor vertex and an edge type of the first vertex in the second data structure managed in the memory of the computer;
storing the first and the second data structure in the memory of the computer, which causes the computer to manage the memory;
obtaining, from the first data structure based on the first vertex, the one or more pointers to the corresponding elements in the second data structure,
wherein obtaining the one or more pointers causes the computing device to manage the memory by performing an efficient lookup in the ToC based on available computational resources; and
managing the memory of the computer further by determining, for the first vertex based on the corresponding elements in the second data structure, a respective edge type associated with the first vertex and a respective successor vertex of the respective edge type, and
wherein a processor of the computer discovers information of interest across multiple types and strength of relationships between elements in the first data structure and elements in the second data structure.

14. The non-transitory computer-readable storage medium of claim 13, wherein the second data structure includes vertex identifiers of successor vertices, and wherein the edge types of the successor vertices are represented based on the location of the vertex identifiers; and wherein the successor vertex is enumerated based on a floor operation and a modulo operation.

15. The non-transitory computer-readable storage medium of claim 13, wherein successors of same edge types of the vertex are represented in a column, and wherein columns representing all edges from the vertex are stored consecutively in the second data structure; and wherein enumerating the successor vertex further comprises identifying start and end indices of successors in the first data structure based on elements in the second data structure.

16. The non-transitory computer-readable storage medium of claim 13, wherein an element of the first data structure points to the Table of Content (ToC) structure, which includes one or more ToC entries, wherein a ToC entry includes an edge type field and a pointer field pointing to a successor of an edge type stored in the second data structure.

17. The non-transitory computer-readable storage medium of claim 16, wherein the edge type field and the pointer field are stored in consecutive order in the second data structure; and
- wherein enumerating the successor vertex further comprises:
  - identifying the ToC in the second data structure based on a pointer in an element in the first data structure, wherein the pointer field of the ToC points to the first successor of the edge type of the vertex; and
  - identifying respective successors from a first to a last successor of the edge type indicated by the edge type field.

18. The non-transitory computer-readable storage medium of claim 16, wherein the edge type field and the pointer field are stored in consecutive order in the second data structure; and
- wherein enumerating the successor vertex further comprises:
  - identifying the ToC in the second data structure based on a pointer in an element in the first data structure, wherein the pointer field of the ToC points to the first successor of the edge type of the vertex before the pointer field; and
  - identifying respective successors from a first to a last successor of the edge type indicated by the edge type field.

19. The non-transitory computer-readable storage medium of claim 16, wherein the pointer field and the edge type field are stored in consecutive order in the second data structure; and
- wherein enumerating the successor vertex further comprises:
  - identifying the ToC in the second data structure based on a pointer in an element in the first data structure, wherein the pointer field of the ToC points to the last successor of the edge type of the vertex before the pointer field; and
  - identifying respective successors in decremental order from a last to a first successor of the edge type indicated by the edge type field.

20. The non-transitory computer-readable storage medium of claim 16, wherein the method further comprises compressing one or more of the edge type field and the pointer field to a short-range value.

21. The non-transitory computer-readable storage medium of claim 16, wherein the ToC does not include the edge type field, and wherein the edge type is implicitly encoded based on the location of the pointer field in the second data structure.

22. The non-transitory computer-readable storage medium of claim 16, wherein source and destination vertices of a respective edge is reversed; and
wherein successor vertices of same edge types of a vertex are represented in a column, and wherein columns representing all edges from the vertex are stored consecutively in the second data structure.

23. The non-transitory computer-readable storage medium of claim 16, wherein the method further comprises determining what the pointer field of the ToC points to based on one or more of:
- preferred ToC information;
- preferred enumeration order;
- space efficiency; and
- ToC compression.

24. The non-transitory computer-readable storage medium of claim 13, wherein the successor vertex is enumerated without considering edge types.

25. A computing system, comprising:
- a processor; and
- a storage device storing instructions that when executed by the processor cause the processor to perform a method, the method comprising:
- representing a first vertex of a graph as an element in a first data structure managed in the memory of the computing system,
- wherein the first data structure includes one or more pointers to corresponding elements in a second data structure which is a Table of Content (ToC) structure, wherein the graph supports multiple edge types between respective vertex pairs;
- representing a successor vertex and an edge type of the first vertex in the second data structure managed in the memory of the computing system;
- storing the first and the second data structure in the memory of the computing system, which causes the computing system to manage the memory;
- obtaining, from the first data structure based on the first vertex, the one or more pointers to the corresponding elements in the second data structure,
- wherein obtaining the one or more pointers causes the computing system to manage the memory by performing an efficient lookup in the ToC based on available computational resources; and
- managing the memory of the computing system further by determining, for the first vertex based on the corresponding elements in the second data structure, a respective edge type associated with the first vertex and a respective successor vertex of the respective edge type,
- wherein the processor of the computing system discovers information of interest across multiple types and strength of relationships between elements in the first data structure and elements in the second data structure.

* * * * *